United States Patent [19]

Graves et al.

[11] Patent Number: 4,771,419
[45] Date of Patent: Sep. 13, 1988

[54] METHOD OF AND SWITCH FOR SWITCHING INFORMATION

[75] Inventors: Alan F. Graves, Sherwood Park; Kent G. Bodell, Richmond; Jeffrey J. Brown, Edmonton; Charles K. Huscroft, Coquitlam, all of Canada

[73] Assignee: Northern Telecom Limited, Montreal, Canada

[21] Appl. No.: 864,666

[22] Filed: May 19, 1986

[51] Int. Cl.$^4$ .............................................. H04Q 11/04
[52] U.S. Cl. ........................................ 370/58; 370/60; 370/68.1
[58] Field of Search .................... 370/53, 58, 60, 68.1

[56] References Cited

U.S. PATENT DOCUMENTS

| | | | |
|---|---|---|---|
| 4,488,290 | 12/1984 | Dunn | 370/58 |
| 4,521,880 | 6/1985 | Orsic | 370/58 |
| 4,564,937 | 1/1986 | Perry | 370/58 |
| 4,644,529 | 2/1987 | Amstutz et al. | 370/60 |
| 4,658,397 | 4/1987 | Kawamura | 370/58 |

OTHER PUBLICATIONS

Article entitled "Burst Switching-An Introduction", by Stanford R. Amstutz, IEEE Communications Magazine, Nov. 1983, pp. 36 to 42.
Article entitled "Application of Burst-Switching Technology to the Defense Communications System", by Joseph F. Haughney, IEEE Communications Magazine, Oct. 1984, pp. 15 to 21.

Primary Examiner—Michael A. Masinick
Attorney, Agent, or Firm—R. John Haley

[57] ABSTRACT

Data to be switched is preceded by a header containing routing information for establishing a connection via a switch, and is accompanied by additional information which indicates the start of the header, in response to which a connection is established, and the end of the data, in response to which the connection is terminated. The switch is a non-saturating, non-blocking, full matrix time switch which uses the routing information to establish a connection within one tdm frame, whereby connections for data of any type (including switch control information) and of arbitrary duration can be handled efficiently. An incoming channel can be connected to any free channel or to a specified outgoing channel of any output port, and contention resolution is provided for simultaneous requests for connection to a single outgoing channel. Interconnections among crosspoint nodes are reduced and simplified using token ring and systolic interconnection techniques.

23 Claims, 18 Drawing Sheets

METHOD OF AND SWITCH FOR SWITCHING INFORMATION

METHOD OF AND SWITCH FOR SWITCHING INFORMATION

This invention relates to a method of switching information, and to a switch for establishing connections to switch information.

BACKGROUND OF THE INVENTION

It is well known to route information, for example in tdm (time division multiplexed) channels, through one or more switches in order to establish communications between terminal devices such as telephones and data terminals. Each switch typically includes a data memory, a connection memory which serves to store addresses representing connections established via the data memory, and connection control means for controlling the contents of the connection memory and thereby controlling the setting-up and taking-down of connections via the switch.

The use of such a connection control means necessitates the provision of a connection control bus, in addition to incoming and outgoing data busses for the information being switched, complicating switch wiring and making integrated circuit fabrication of the switch difficult because of the large number of interconnections which are required. In addition, the use of the connection control means results in a considerable overhead and delay in establishing and terminating connections, as a result of which the switching of short messages, and the switching of switch control information in the same manner as data, is inefficient or impractical. Furthermore, the connection control means can become overloaded or saturated, so that it is not capable of establishing connections even though paths for such connections are available through the switch.

Thus there are distinct problems associated with the use of such a connection control means. A further problem with switches is that of blocking, in which no free path exists through a switch between an incoming channel and an outgoing channel which is free and to which the incoming channel is to be connected. It is known to avoid the problem of blocking by using single stage time switches which are inherently non-blocking, and to use an array or matrix of single stage time switches, each constituting a crosspoint node, to provide both space and time switching of channels. However, the use of a matrix of crosspoint nodes exacerbates the problem of providing interconnections to the connection control means.

An object of this invention, therefore, is to provide an improved method of switching information, and to provide an improved switch for establishing connections between incoming and outgoing tdm channels, which reduces or eliminates at least some of the above problems associated with known switching methods and switches.

SUMMARY OF THE INVENTION

According to one aspect of this invention there is provided a method of switching, in a switch comprising a plurality of crosspoint nodes arranged in a matrix of n rows and m columns, where n and m are positive integers, tdm (time division multiplexed) information comprising a header including routing information for the switch, data to be switched following the routing information for the switch, and additional information providing an indication of the start of the header and an indication of the end of the data, the method comprising the steps of, in each crosspoint node: determining in respone to the indication of the start of the header and in dependence upon the routing information whether a connection is to be made through the node and if so establishing a connection through the node; and terminating the connection through the node in response to the indication of the end of the data.

Thus in accordance with the invention the information to be switched itself comprises routing information in a header preceding the data to be switched, whereby the routing information for each connection is included in the data stream itself whereby the need for a separate connection control bus and connection control means is avoided. In order to enable the start of the header and the end of the data to be identified for establishing and terminating connections, the additional information is provided. In a simple form, as described below in greater detail, this additional information can comprise a single bit (binary digit) on an additional parallel data line, which bit represents whether or not the respective channel is carrying data (or a header) in respect of a connection which has been or is to be established, this bit thus changing its state at the start of a header and at the end of the data which follows the header.

Preferably the connection through the node is established for only the data and additional information which follows the routing information for the switch. This enables the data to be preceded by a compound header containing routing information for each of a plurality of switches through which the data is to be switched in succession, each switch truncating the header and additional information at its front end, i.e. in respect of the routing information for that switch, whereby each switch in the succession receives and uses the routing information which it needs, and forwards to tha next switch (if any) all of the following information, regardless of whether this is data or further header information. In this manner the information can thread itself through one or more switches in a network until it reaches its desired destination.

Preferably the connection through the node is established in dependence upon the routing information prior to the occurrence of the data to be switched following the header.

In this manner connections are established rapidly through the switch so that the data is not substantially delayed. In consequence, the method enables efficient handling of very short messages with little delay, whereby switch control information and inter-switch communications can be handled in the same manner as data traffic. More particularly, the operation of a switch in accordance with the method of the invention is made independent of the duration or content of the information being switched. In addition, the rapid handling of the routing informtion to establish a connection through a switch avoids saturation or overloading of the connection control function.

According to another aspect this invention provides a method of switching, in a switch comprising a plurality of crosspoint nodes arranged in a matrix of n rows and m columns, where n and m are positive integers, information of channels multiplexed in tdm (time division multiplexed) frames, the information of each channel comprising a header including routing information for a switch, data to be switched following the routing information for the switch, and additional information providing an indication of the start of the header and an indication of the end of the data, the method comprising the steps of, for each channel and in each crosspoint node: in response to the indication of the start of the header and in dependence upon the routing information, determining whether a connection is to be made through the node and if so establishing a connection for at least the data and additional information following the routing information for the switch, said connection being established within one frame of the end of the routing information terminating the connection in respone to the indication of the end of the data.

Preferably m is a plural integer, the switch comprising in each row a plurality of m crosspoint nodes each associated with a respective output port of the switch for establishing a connection of a channel thereto, wherein said routing information comprises an output port number in respect of the output port to which a connection is to be established, and the step of determining in each crosspoint node whether or not a connection is to be made through the node is dependent upon the output port number in said routing information.

This enables an incoming channel to be connected to any of a plurality of output ports. The connection may be established to any free outgoing channel on the identified output port, or to a specific outgoing channel of the output port. In the latter case the routing information further comprises a channel number identifying one of a plurality of tdm channels of an output port to which a connection is to be established, and the method preferably further comprises the step of establishing, in the crosspoint node in which it is determined that a connection is to be made, a connection to a channel of the output port in dependence upon the channel number in said routing information. Conveniently the channel number follows the output port number in the routing information in successive tdm frames.

According to a further aspect this invention provides a switch for establishing connections between incoming tdm (time division multiplexed) channels on n input ports and outgoing tdm channels on m output ports, where n and m are positive integers, information on each incoming channel to be connected comprising a header including routing information for the switch, data to be switched following the routing information for the switch, and additional information providing an indication of the start of the header and an indication of the end of the data, the switch comprising plurality of crosspoint nodes in a matrix of m columns and n rows, each crosspoint node coupled between a respective input port and a respective output port for establishing channel connections therebetween, each crosspoint node including means for establishing a connection, between an incoming channel of the respective input port and an outgoing channel of the respective output port, in response to the indication of the start of the header on the incoming channel and in dependence upon the routing information, and means for terminating the connection in response to the indication of the end of the data.

Preferably there is a plurality of crosspoint nodes in each row, the crosspoint nodes of each column being coupled to a respective one of a plurality of output ports, and said routing information comprises an output port number in respect of the output port to which a connection is to be established, each crosspoint node comprising activating means responsive to an indication of the start of a header for an incoming channel on the respective input port for activating the crosspoint node to establish a connection to an outgoing channel of the respective output port in dependence upon the output port number in said routing information.

Preferably there is a plurality of crosspoint nodes in each column, each crosspoint node of a column including means for resolving contention among a plurality of input channels for establishing a connection to the same outgoing channel of the respective output port.

The means for resolving contention can comprise storage means for storing, for each output port, an indication of whether or not each outgoing channel on the output port is free, in which case each crosspoint node preferably has a predetermined priority for resolving contention, for example determined by its position in the matrix, and includes activating means responsive to an indication of whether or not each outgoing channel on the output port is free; each crosspoint node having a predetermined priority for resolving contention and including: activating means responsive to an indication of the start of a header for an incoming channel on the respective input port for producing a request signal for establishing a connection to an outgoing channel if the outgoing channel is indicated by the indication in said storage means to be free, and for modifying said indication in response to the request signal to indicate that the outgoing channel is not free; means for producing a request cancelling signal, in response to the request signal, for a crosspoint node in the same column having a lower priority; means for cancelling the request signal in response to a request cancelling signal from a crosspoint node in the same column having a higher priority; and means for establishing a connection of the incoming channel to the outgoing channel in response to a request signal which is not cancelled.

The storage means can be provided for each output port separately from the crosspoint nodes of the respective column, or it can be distributed among the crosspoint nodes of the column.

Alternatively, the means for resolving contention can comprise token ring means for each column of crosspoint nodes, each token ring means being arranged to supply cyclically to each crosspoint node in the column in turn a token in respect of each outgoing channel of the respective output port, each token providing an indication of whether or not the respective outgoing channel is free.

In this case preferably each crosspoint node in a column includes means for selectively supplying as output data from the crosspoint node either data from an incoming channel of the respective input port for a connection established via the crosspoint node or data output from a preceding crosspoint node in the same column. This considerably facilitates interconnections between the crosspoint nodes of each column, as each crosspoint node is connected only to the immediately preceding and following crosspoint nodes in the same column, and only the last crosspoint node of the column is connected to the respective output port. The interconnections are further enhanced in that the token for each outgoing channel of each output port can constitute said additional information, which therefore does not have to be coupled separately between the crosspoint nodes.

This arrangement, in which a columnar data bus for each output port is avoided by a systolic interconnection of adjacent crosspoint nodes in the column, can be extended also to provide a systolic interconnection of adjacent crosspoint nodes in each row of the matrix, whereby a fully systolic matrix is provided and both column and row data busses coupling all of the crosspoint nodes in the same column and row, respectively, are dispensed with, each crosspoint node having input and output data connections to at most four other crosspoint nodes, namely those which are immediately adjacent in the same row or column.

BRIEF DESCRIPTION OF THE DRAWINGS

The invention will be further understood from the following description with reference to the accompanying drawings, in which.

DESCRIPTION OF EMBODIMENTS OF THE INVENTION

In embodiments of the invention described below, data traffic is switched through a switch matrix in dependence upon routing information contained in a data traffic header, and hence as part of the data traffic itself. The header is stripped from the data traffic in the switching process, whereby a plurality of headers, each containing routing information for rounting a data call through a plurality of switch matrices in succession, can be provided successively at the start of the data traffic, each header being stripped in the switching process in the respective switch matrix.

In order to identify the occurrence of a data call, and in particular the start of a header, at least one additional line is associated with the data and is referred to herein as a busy line. In a simple form, the busy line carries a 0 bit in the absence of data traffic and a 1 bit in the presence of data traffic on the associated data lines. Thus in this case the busy line becomes a binary 1 at the start of a data call header, and remains a binary 1 for the entire duration of the data call, becoming a binary 0 at the end of the data call. The data may comprise arbitrary information such as voice channel signals, communications traffic, and switching network and control information, and may have an arbitrary duration, for example from milliseconds for a short message or control information to weeks, months, or years for a dedicated communications path.

FIG. 1 illustrates the format of a data call as described above, the upper block in FIG. 1 representing data bytes and the corresponding state of the busy line entering a switch matrix at its input side and the lower block representing the corresponding information leaving the switch matrix on its output side, in each case as a function of time in a horizontal direction.

Figure 1:
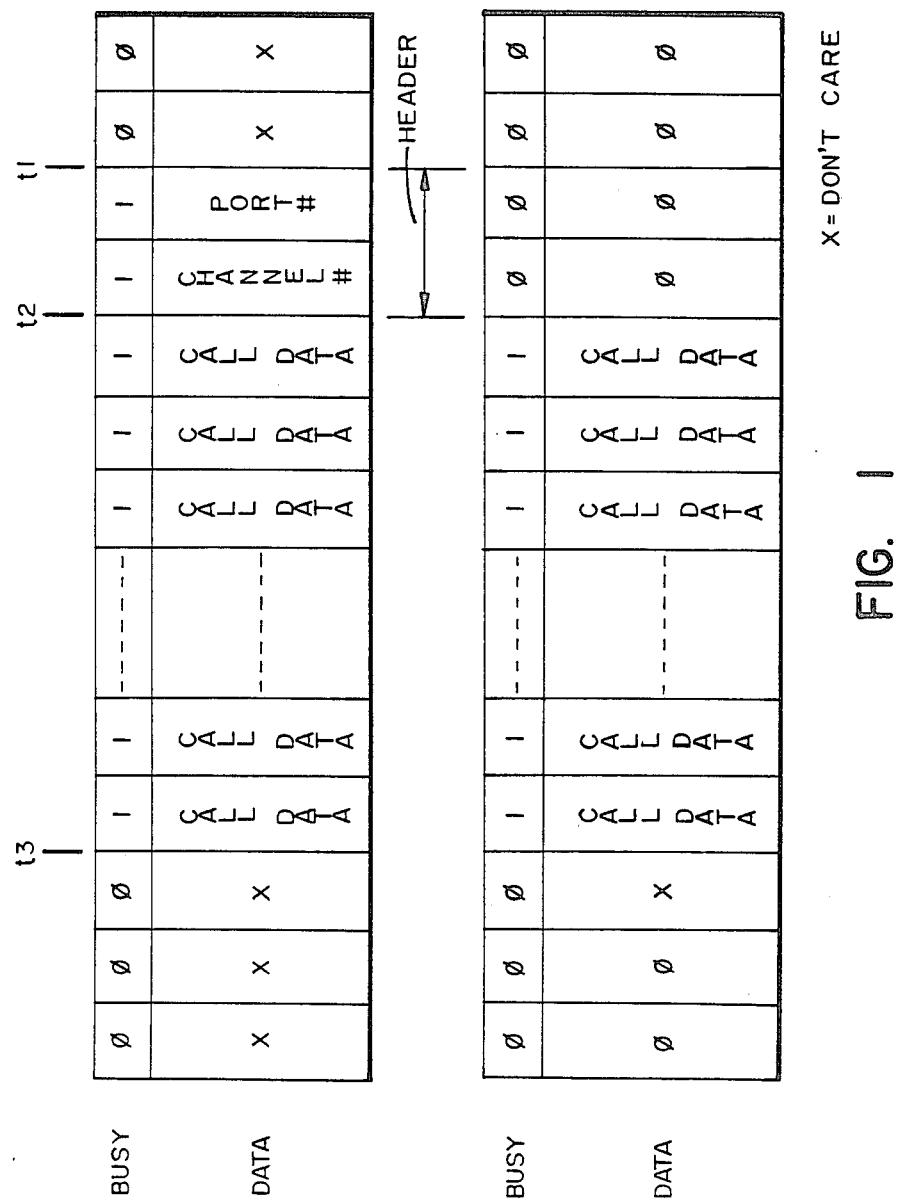
FIG. 1 schematically illustrates one format of data, constituting a call to be switched, before and after switching.

As illustrated in FIG. 1, a data call to be switched, incoming on a particular channel on a particular input port to the switch matrix, is preceded by a 0 state of the busy line and arbitrary data information. At the start of the data call, at a time t1 at the input port of the switch, the busy line changes to a 1 state and the data information represents an output port number of the switch matrix. This is followed by a data byte representing a channel number on the output port, whereby these two data bytes together constitute a header of routing information identifying the output channel and port, and hence the route through the switch, for which the following data is intended.

The header is followed, commencing at a time t2, by call data which may comprise further headers as mentioned above, source information identifying the source from which this data call originated (and which may ultimately be used for establishing in a similar manner a data call in an opposite direction of transmission through a switching network to establish two independent paths through the network for a two-way connection), and other control signals or information which may be desired for particular purposes, as well as actual data to be communicated. This is represented as call data in FIG. 1, and as already indicated may have an arbitrary duration and content as far as the switching of the information is concerned.

At the end of the call data, at a time t3, the busy line returns to the 0 state, it having remained 1 for the entire duration of the call from the time t2 to the time t3. As shown in the lower block in FIG. 1, only the call data between the times t2 and t3 is switched through the switch matrix to the output channel and port, and the outgoing busy line adopts the 1 state from the 0 state at the time t2 instead of at the time t1. In other words, the header comprising the routing information for the particular switch matrix is removed or stripped, and the change in state of the busy line from 0 to 1 is correspondingly delayed by the duration of this header from the time t1 to the time t2, by passage of the data through the switch matrix.

The above example of a data call using a simple state of the busy line to indicate the duration of the call at any point in a switching network is used for clarity and simplicity in describing the embodiments of this invention, but it should be appreciated that many variations and adaptations of this are possible and desirable for example for error detection and correction. For example, the information on the busy line may be time division multiplexed to convey more information or for error protection purposes, and/or it may be provided on more than one line, and/or it may comprise parity or CRC information for the data bits, and/or it may comprise redundantly transmitted bits. Furthermore, the header information may comprise a different number of data bytes, and the occurrence of the header and other information may be indicated by a preceding data byte or bytes acting as a flag. Numerous other techniques may be used to indicate and represent the contents of the data bytes, it only being necessary for operation of the switch matrix that the header information be identifiably contained on the data path.

Figure 2:
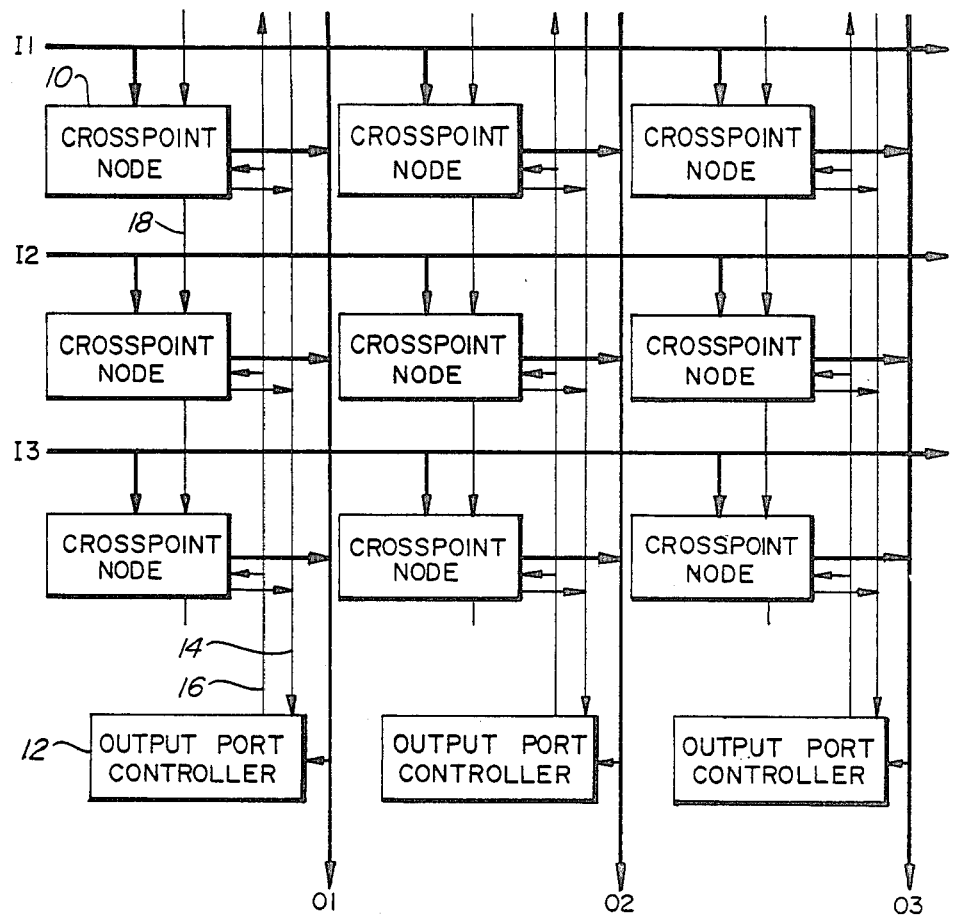
FIG. 2 schematically illustrates in the form of a block diagram a switch matrix in accordance with an embodiment of the invention.

Referring now to FIG. 2, there is illustrated a switch matrix comprising an array of crosspoint nodes 10 for coupling any of N data channels from any of a plurality of input ports to any output channel on any of a plurality of output ports. For convenience and clarity, only three input ports 11 to 13 and three output ports 01 to 03; are illustrated in FIG. 2, there consequently being a 3×3 array of crosspoint nodes 10 each connected to a respective combination of input and output ports. Each input or output port comprises parallel data and busy lines for carrying corresponding signals as described above.

Associated with each output port 01 to 03 is a respective output port controller 12, which in addition to being coupled to the respective output port is coupled to all of the crosspoint nodes 10 in the same column, i.e. connected to this same output port, via lines 14 and 16 which are referred to as "book" and "booked" lines respectively. In addition, the successive crosspoint nodes are connected together via a 37 cancel" line 18 which is chained through the nodes in succession in a manner which will become clear from the description below.

Figure 3:
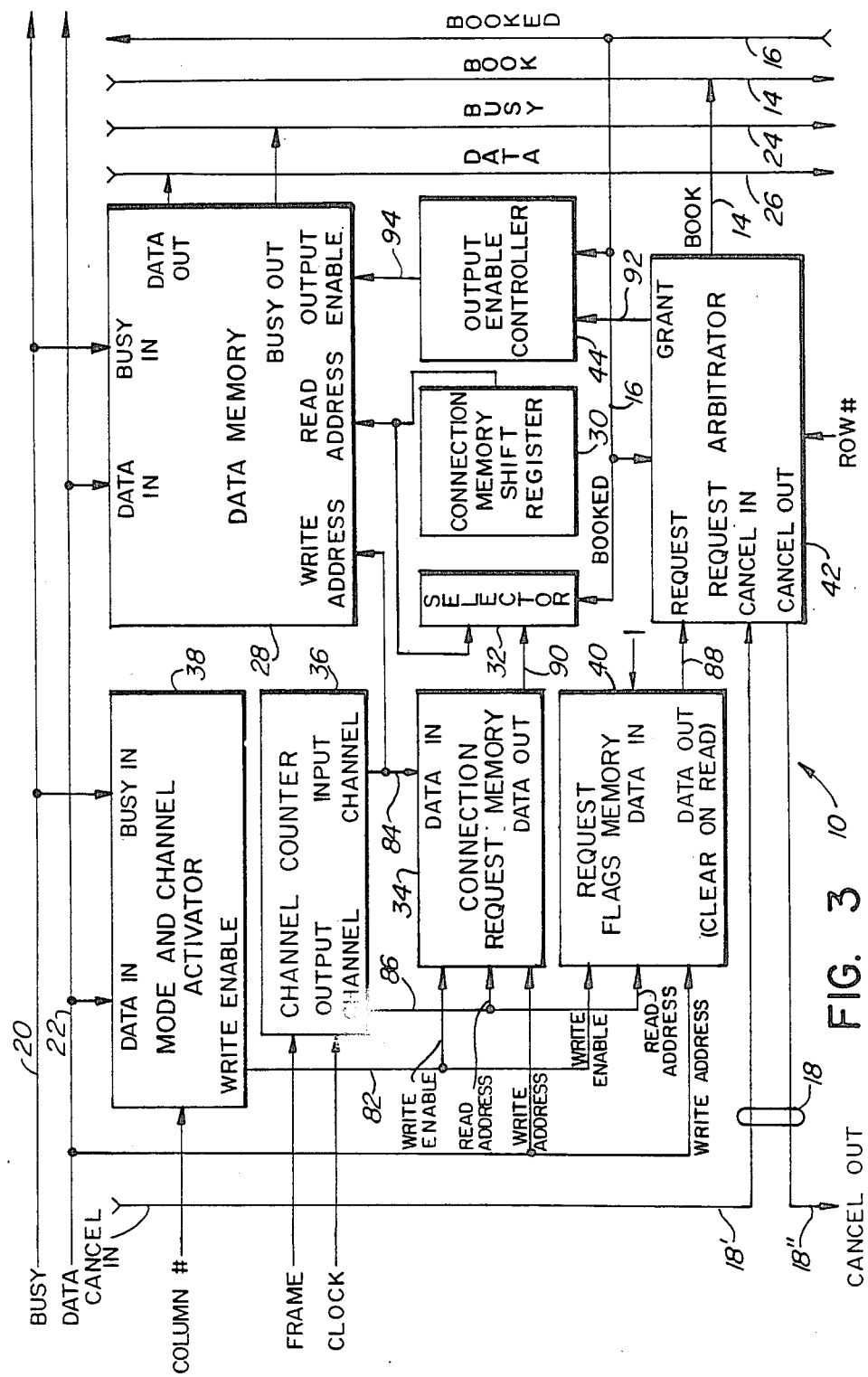
FIG. 3 is a block schematic diagram illustrating one form of crosspoint node of the switch matrix of FIG. 2.

FIG. 3 illustrates one crosspoint node 10 of the switch matrix of FIG. 2, showing separately the incoming busy line 20 and parallel data lines 22 of the respective input port, the outgoing busy line 24 and parallel data lines 26 of the respective output port, the book and booked lines 14 and 16, and the cancel line 18 having an input port 18′ and an output port 18″ which respectively come in from a preceding and go out to a following crosspoint node in the same column. The crosspoint node is supplied with column and row numbers which represent the position of the crosspoint node in the array and correspond to output port and input port numbers respectively, and with frame and clock timing signals.

The crosspoint node comprises a data memory 28 having data inputs coupled to the lines 20, 22, and outputs coupled to the lines 24, 26; a connection memory constituted by a shift register 30 whose contents constitute read addresses for the data memory 28 and are selectively cycled through the shift register 30 via a selector 32; a connection request memory 34 for supplying addresses to the selector 32; a channel counter 36 for supplying addresses to the connection request memory 34; a node and channel activator 38 for recognizing the start of a data call on the input port lines 20, 22; and a request flags memory 40, a request arbitrator 42, and an output enable controller 44 whose functions will become clear from the following description.

Figure 4:
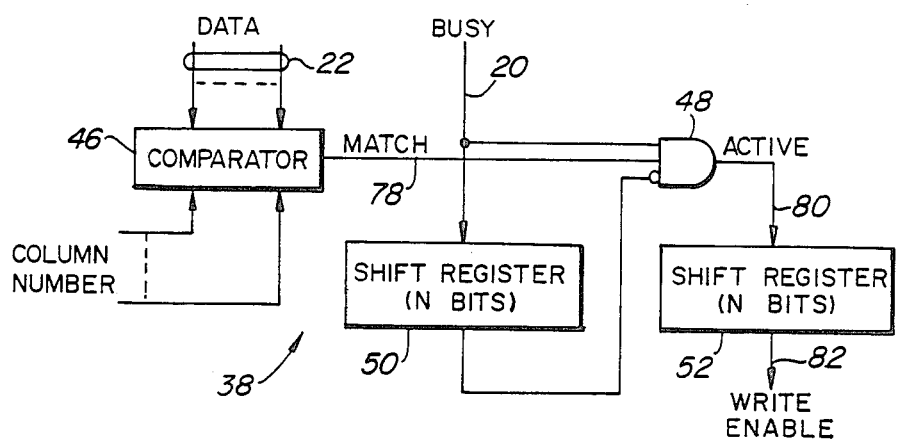
FIG. 4 is a block schematic diagram of a node and channel activator of the node of FIG. 3.
Figure 5:
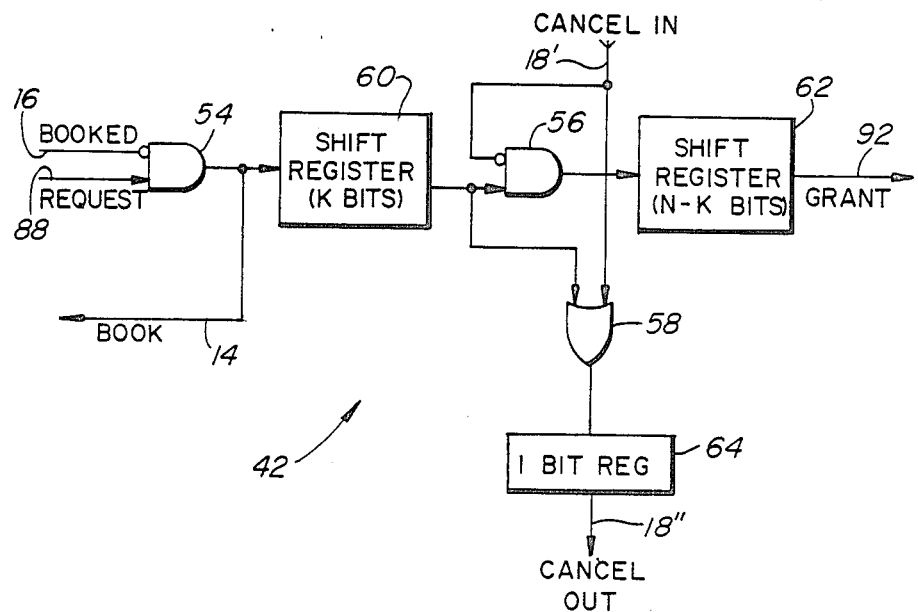
FIG. 5 is a block schematic diagram of a request arbitrator of the node of FIG. 3.
Figure 6:
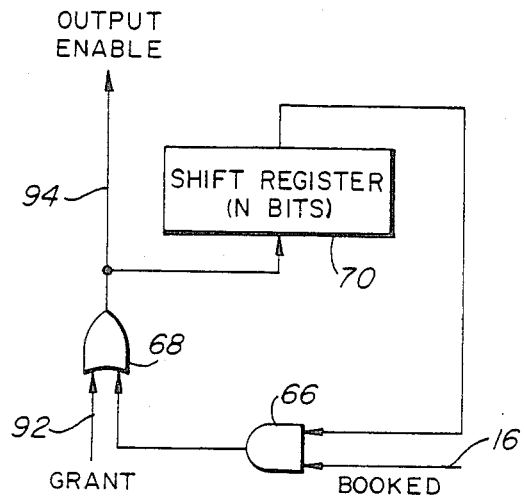
FIG. 6 is a block schematic diagram of an output enable controller of the node of FIG. 3.
Figure 7:
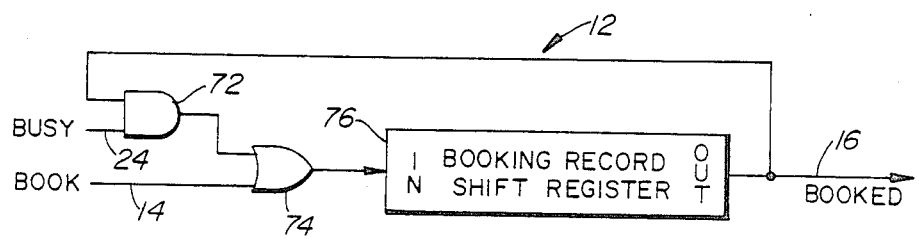
FIG. 7 is a block schematic diagram of an output port controller of the switch matrix of FIG. 2.

The operation of the crosspoint node of FIG. 3 is described below with additional reference to FIGS. 4 to 6, which illustrate the units 38, 42, and 44 respectively, and to FIG. 7 which illustrates the output port controller 12 shown in FIG. 2. As shown in FIG. 4, the node and channel activator 38 comprises a comparator 46, an AND gate 48 having one inverting and two non-inverting inputs, and two N-bit shift registers 50 and 52, where N is the number of time division multiplexed data channels in each frame on each input port. As shown in FIG. 5, the request arbitrator comprises AND gates 54 and 56 each with one inverting and one non-inverting input, an OR gate 58, a K-bit shift register 60, an (N-K)-bit shift register 62, and a 1-bit register 64, K being the row or input port number of the crosspoint node. As shown in FIGS. 6 and 7, each of the output enable controller 44 and the output port controller 12 comprises an N-bit shift register, 2-input AND gate, and 2-input OR gate respectively referenced 66, 68, and 70 (FIG. 6) and 72, 74, 76 (FIG. 7), it being assumed here that there are also N channels in each frame on each output port.

At the start of a data call on a channel of an input port, as shown in FIG. 1 the busy line goes from 0 to 1 for successive bytes of the channel, and hence in successive frames at the input port. This initial 1 state on the busy line is accompanied on the data lines by the desired switch output port number, which corresponds to the column number of the crosspoint node through which the data must be switched. In the node and channel activator 38 of the crosspoint node 10 in this column which is connected to the relevant input port, the comparator 46 compares the data from the data lines 22 with the column number and detects an identity to produce a match signal on a line 78. This signal is gated by the gate 48 with the current busy line signal from the line 20 and with the inverted busy line signal of the previous frame, which has been delayed for 1 frame in the shift register 50, to produce an active signal on a line 80 only at the start of the data call. This active signal is delayed for one frame in the shift register 52, to produce on a line 82 a write enable signal which is coincident with the second header byte of the data call. At the same time the channel counter 36, which is synchronized by the clock and frame signals already referred to, produces on a bus 84 the input channel number on which the data call is present. This is supplied as data to the connection request memory 34 and as a write address to the data memory 28, in response to which the data and busy signals on the lines 20 and 22 are stored in this data memory 28.

In response to the write enable signal on the line 82, the input channel number on the bus 84 is stored in the connection request memory 34 at an address constituted by the desired output channel number, which is supplied as a write address from the data lines 22. At a corresponding address supplied in a similar manner to the request flags memory 40, a 1 bit is stored as a request flag for the respective output channel. The channel counter 36 also produces on a bus 86 an output channel number, all of the output channel numbers being produced cyclically and sequentially in a similar manner to the input channel numbers, which is supplied as a read address to the connection request memory 34 and the request flags memory 40. In consequence, in response to the output channel number of a requested output channel next appearing on the bus 86, the flag is read from the memory 40 and supplied via a line 88 as a request signal to the request arbitrator 42, the flag in the memory 40 being cleared, and the requesting input channel number is supplied via a bus 90 from the connection request memory 34 to the selector 32.

In the output port controller 12 of the respective output port (switch matrix column), a 1 or 0 bit is stored in the shift register 76, which constitutes a booking record shift register, for each output channel in dependence upon whether the channel is busy (or booked as described below) or available. The output of the shift register 76 constitutes the signal booked on the line 16, and is fed back to the AND gate 72 to be gated with the outgoing busy signal on the line 24 whereby an output channel which remains busy will retain a 1 bit in the booking record shift register 76. The output of the AND gate 72 is gated in the OR gate 74 with the signal book on the line 14 before being supplied to the input of the shift register 76. Thus for any output channel a book signal on the line 14 sets a 1-bit in the booking record shift register 76, and a busy bit of 0 clears this 1 bit in the shift register 76 at the end of a data call.

If the requested output channel is available, the signal booked on the line 16 is 0 to cause the selector 32 to supply the requesting input channel number from the bus 90 to the connection memory shift register 30, and to enable the gate 54 in the request arbitrator 42 (FIG. 5) to pass the request signal on the line 88 to produce the book signal on the line 14, whereby the output channel is then identified as booked in the shift register 76.

The request arbitrator 42 resolves contention among different crosspoint nodes 10 in the same column for the same output channel. To this end the shift registers 60 and 62 in the request arbitrator 42 together constitute an N-bit shift register, providing a 1 frame delay, which produce a signal grant on a line 92 in response to the signal book produced by the gate 54 on the line 14 only in the absence of an incoming cancel signal on the line 18′ The shift register 60, 62 is split at the K-th bit position, where K is the row number of the relevant crosspoint node supplied to the request arbitrator 42 as shown in FIG. 3, where the signal book propagating through this shift register is inhibited by the gate 56 in the presence of a cancel signal from a crosspoint node with a smaller row number (and hence a higher priority). In the absence of such an incoming cancel signal on the line 18′, the signal grant is produced on the line 92 after a total delay of 1 frame, and hence coincident with the first byte of the data call following the header. An outgoing cancel signal on the line 18″ to higher-row-numbered (and hence lower priority) crosspoint nodes is produced at the output of the 1-bit register 64, which compensates for timing differences between the adjacent rows of crosspoint nodes, from the output of the OR gate 58 in response to either an incoming cancel signal on the line 18′ or a signal book propagated through the shift register 60.

In the manner described above, an output channel requested simultaneously by a plurality of input channels on the same or different input ports is assigned to only one input channel. For the requested output channel, the requesting input channel number is cycled through the connection memory shift register 30 via the selector 32 because the signal booked on the line 16 is a logic 1, and the signal grant is produced on the line 92 during the first non-header byte of the data call. The signal grant is passed by the OR gate 68 in the output enable controller 44 (FIG. 6) to produce on a line 94 an output enable signal for the data memory 28. In the absence of the output enable signal logic 0s are supplied from the data memory 25 to the busy and data lines 24 and 26 as illustrated in the lower block of FIG. 1. In the presence of the output enable signal the busy and data signals stored in the data memory 28 are read out from the memory at a read address constituted by the input channel number supplied from the connection memory shift register 30, whereby the data call is switched through the crosspoint node, and hence through the switch matrix, in the manner illustrated in FIG. 1 with the header stripped therefrom.

In the output enable controller 44 the output enable signal on the line 94 is cycled through the shift register 70, providing an N-bit or 1-frame delay, via the AND gate 66 and the OR gate 68 for as long as the signal booked on the line 16 continues to enable the AND gate 66. At the end of a data call, as already described the busy signal on the line 24 becomes 0 whereby the signal booked on the line 16 also becomes 0 to inhibit the gate 66 and terminate the output enable signal on the line 94, whereby logic 0s are again supplied to the outgoing busy and data lines 24 and 26.

Figure 8:
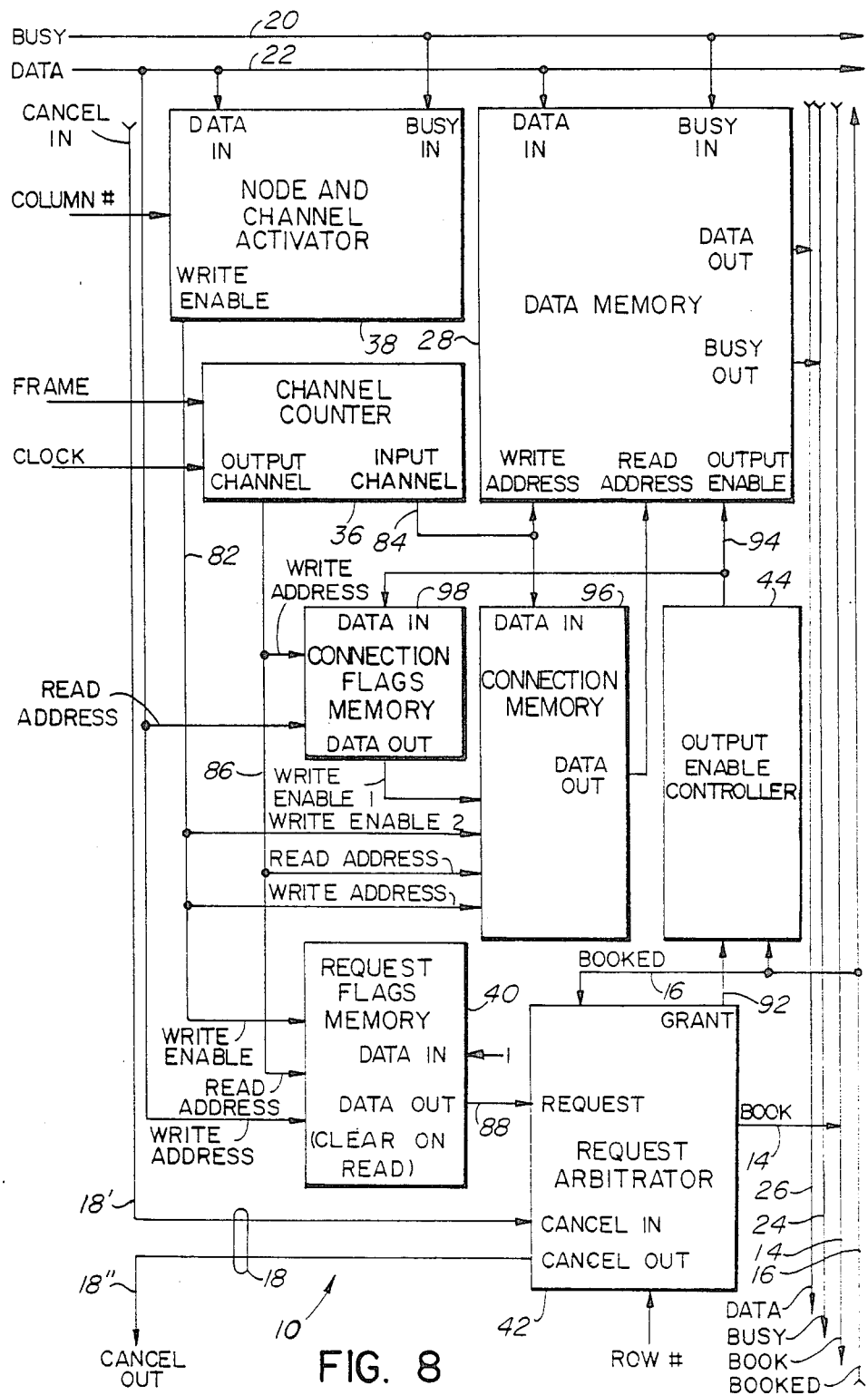
FIG. 8 is a block schematic diagram illustrating an alternative form of crosspoint node of the switch matrix of FIG. 2.

FIG. 8 illustrates an alternative form of crosspoint node 10 in which the connection request memory 34, selector 32, and connection memory shift register 30 of FIG. 3 are replaced by a connection memory 96 and a connection flags memory 98, the remainder of the crosspoint node being as described above.

In the crosspoint node of FIG. 8 the output enable signal on the line 94, which signal represents whether or not each respective output channel is connected to an input channel, is stored as a connection flag for the respective output channel in the memory 98, being written therein at an address corresponding to the output channel number on the bus 86. The data on the lines 22 is used as a read address for the connection flags memory whose output constitutes another write enable input for the connection memory 96. If an output channel requested in the second header byte is unconnected as indicated by the connection flags memory 98, then in response to the write enable signal on the line 82 the requesting input channel number on the bus 84 is stored directly in the connection memory 96 at a write address supplied from the data lines 22 and corresponding to the requested output channel number. Reading from the connection memory 96 is effected from output channel number addresses supplied via the bus 86 from the channel counter 36.

Figure 11:
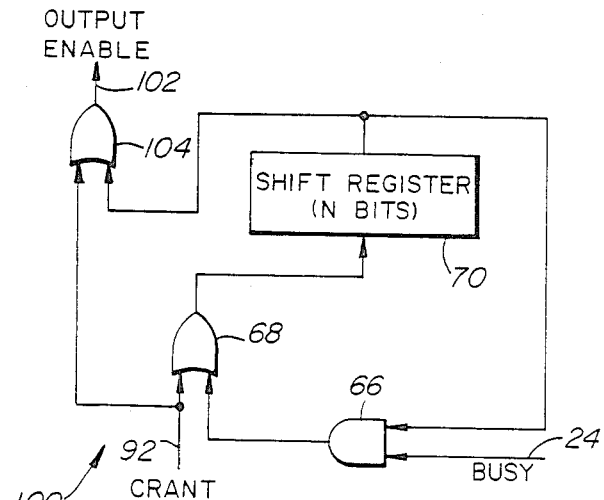
FIG. 11, which appears on the same sheet as FIGS. 6 and 7, is a block schematic diagram illustrating an output enable controller of the node of FIG. 10.
Figure 9:
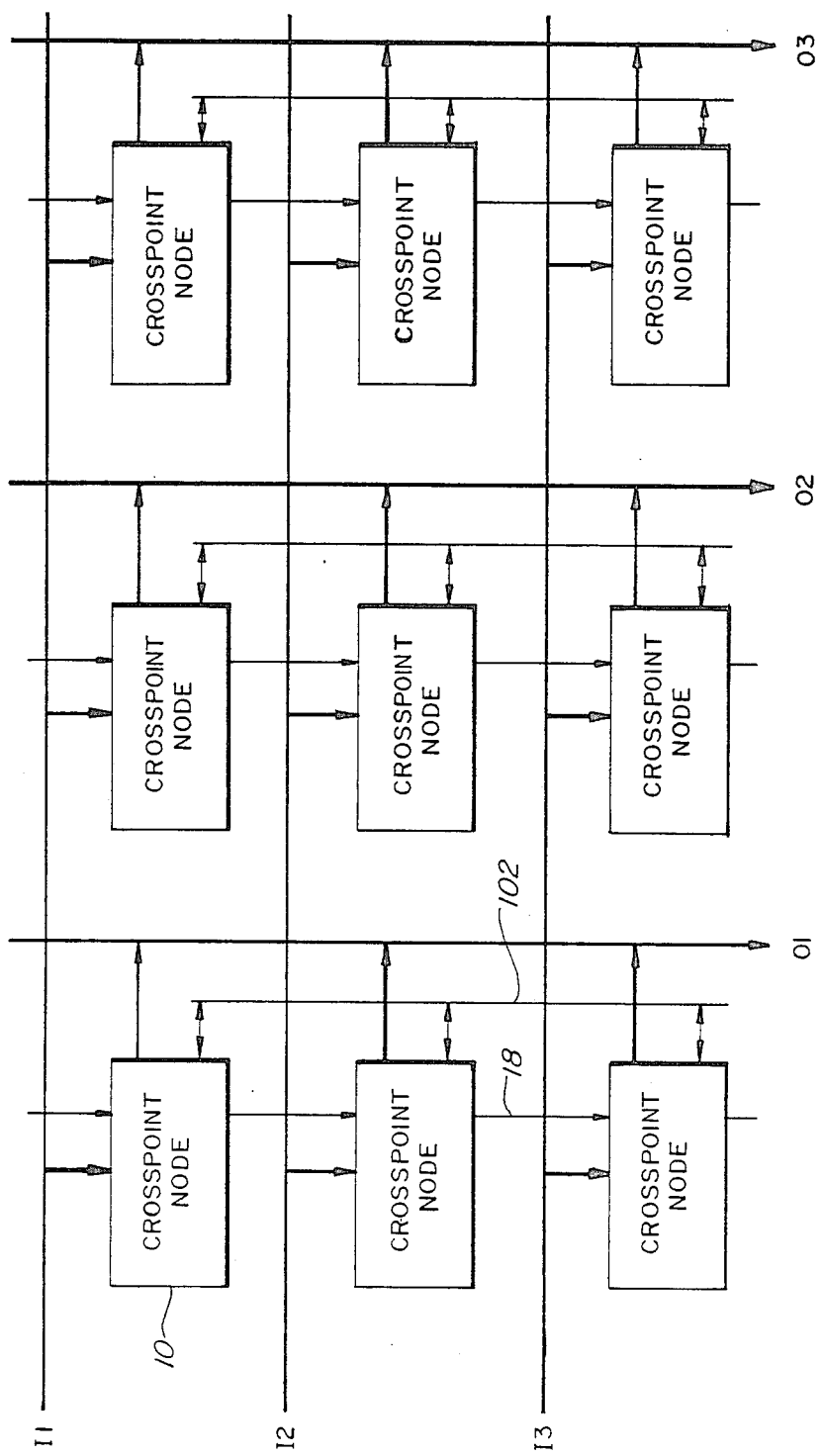
FIG. 9 schematically illustrates in the form of a block diagram a switch matrix in accordance with another embodiment of the invention.
Figure 10:
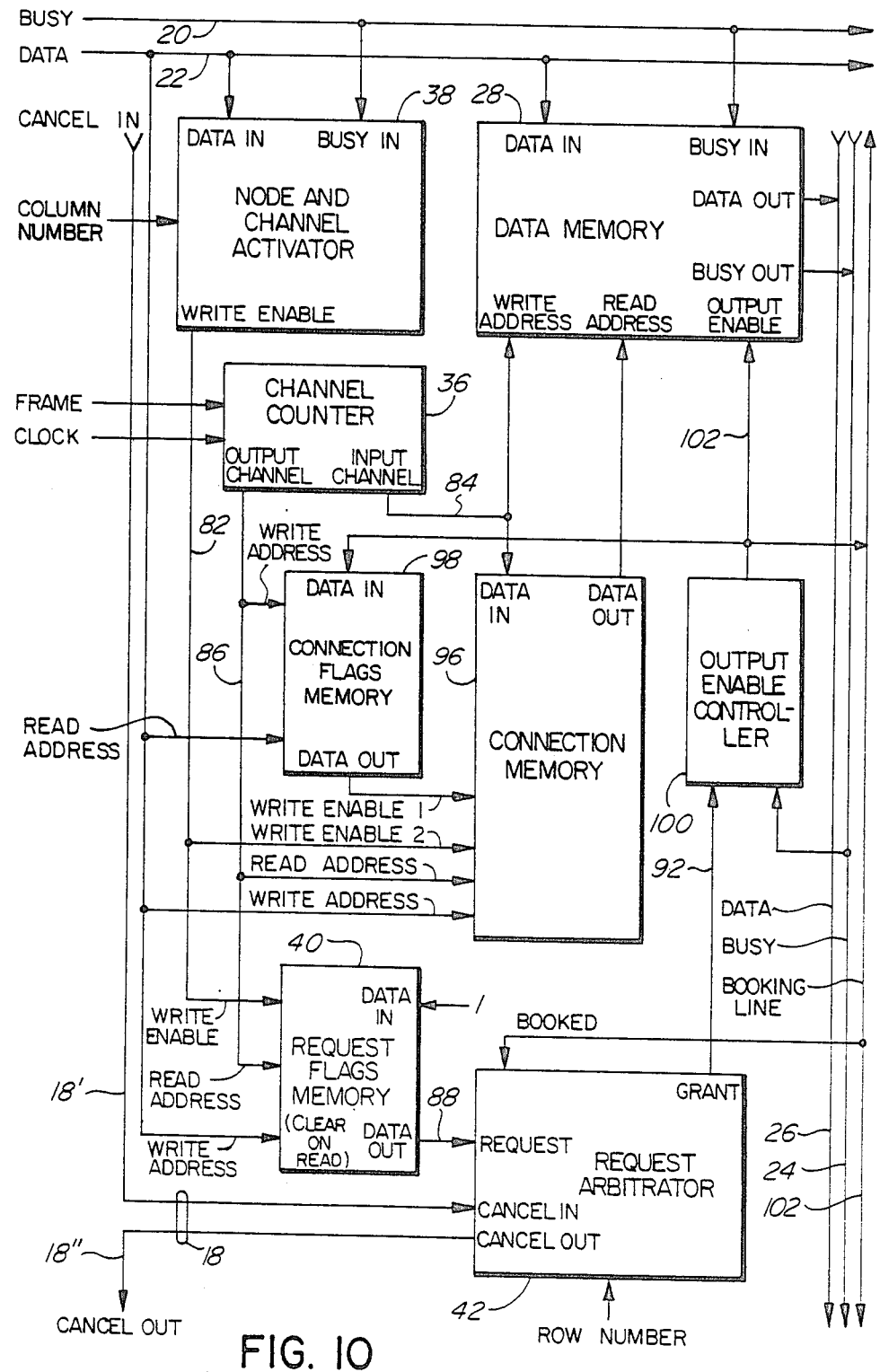
FIG. 10 is a block schematic diagram illustrating a form of crosspoint node of the switch matrix of FIG. 10.

FIGS. 9 to 11 illustrate a further modification of the switch matrix and crosspoint nodes, in which the output port controllers 12 are dispensed with and the output enable controllers 44 are replaced by modified controllers 100. This modification also replaces the two lines (book and booked) 14 and 16 by a signal booking line 102, thereby reducing interconnections between the crosspoint nodes.

Referring to FIG. 10, the output enable signal from the output enable controller is supplied not only to the data memory 28 and connection flags memory 98 but also to the booking line 102, and thence to the request arbitrator 42 for which it constitutes the signal booked. The request arbitrator 42 is as described above with reference to FIG. 5, except that the output signal book on the line 14 is no longer required. The output enable controller 100, shown in FIG. 11, is similar to the controller 44 in FIG. 6 in that it comprises the gates 66 and 68 and shift register 70, except that now the signal busy on the line 24 is used as an enabling input for the AND gate 66, and the output enable signal is taken from the output of an additional OR gate 104 whose inputs are supplied with the signal grant on the line 92 and the output of the shift register 70.

In this modified arrangement, the output enable controller 100 in each crosspoint node 10 directly monitors and provides an indication of the busy or available state of each output channel of the respective output port. The output enable signal is produced in response to the signal grant on the line 92 as before, and is maintained via the shift register 70 while the busy signal on the line 24 continues to enable the AND gate 66.

The modification described above with respect to FIGS. 9 to 11 is desirable because of the practical need, which is increasingly important with increasing switch matrix sizes, to reduce as far as possible the number of interconnections which must be provided among the crosspoint nodes of the switch matrix. Furthermore, it is desirable to make those interconnections which must be provided as short and direct as possible. As a step towards this end, the switch matrix may be further modified as described below with reference to FIGS. 12 to 14.

Figure 12:
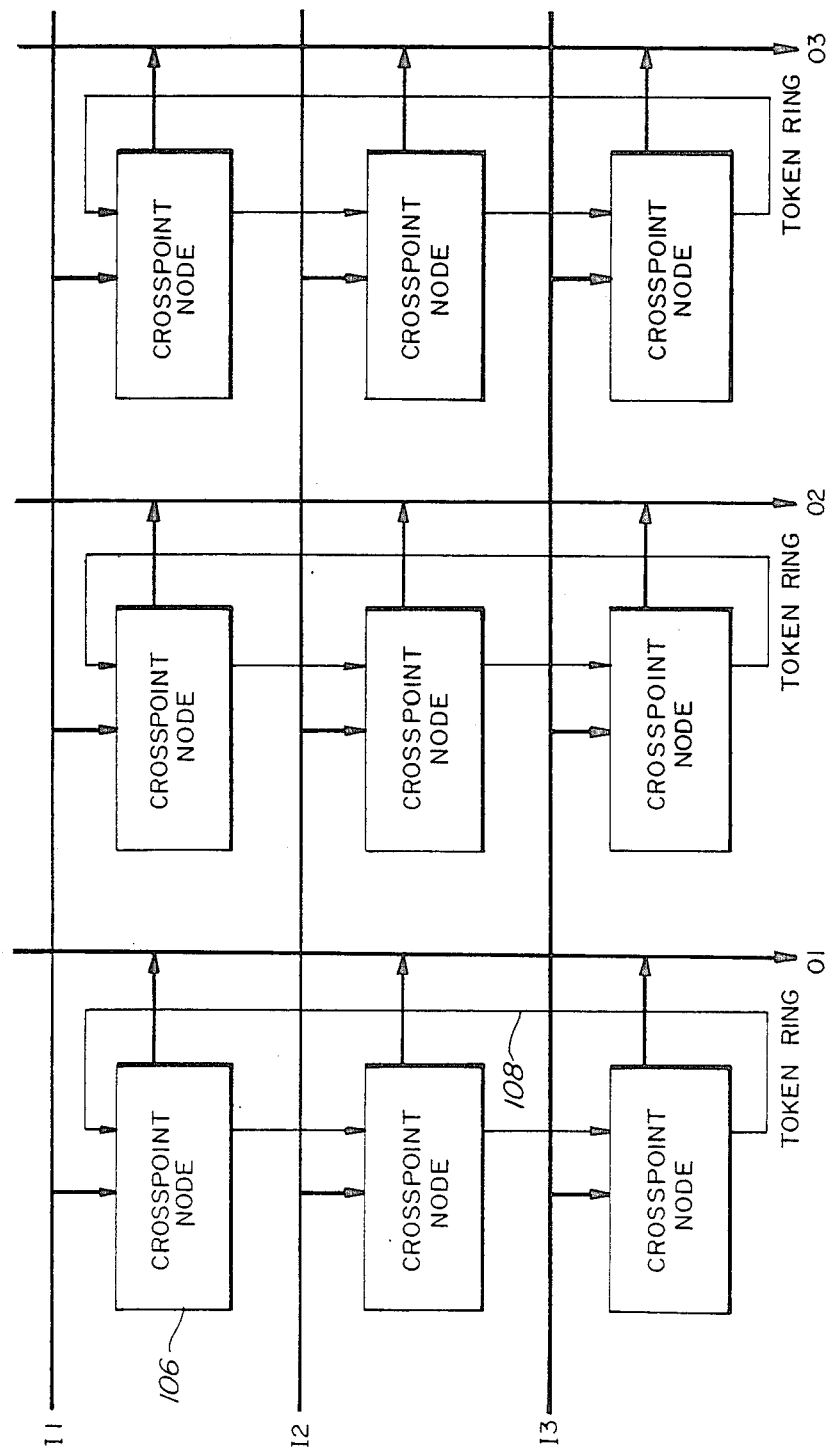
FIG. 12 schematically illustrates in the form of a block diagram a switch matrix in accordance with a further embodiment of the invention.
Figure 13:
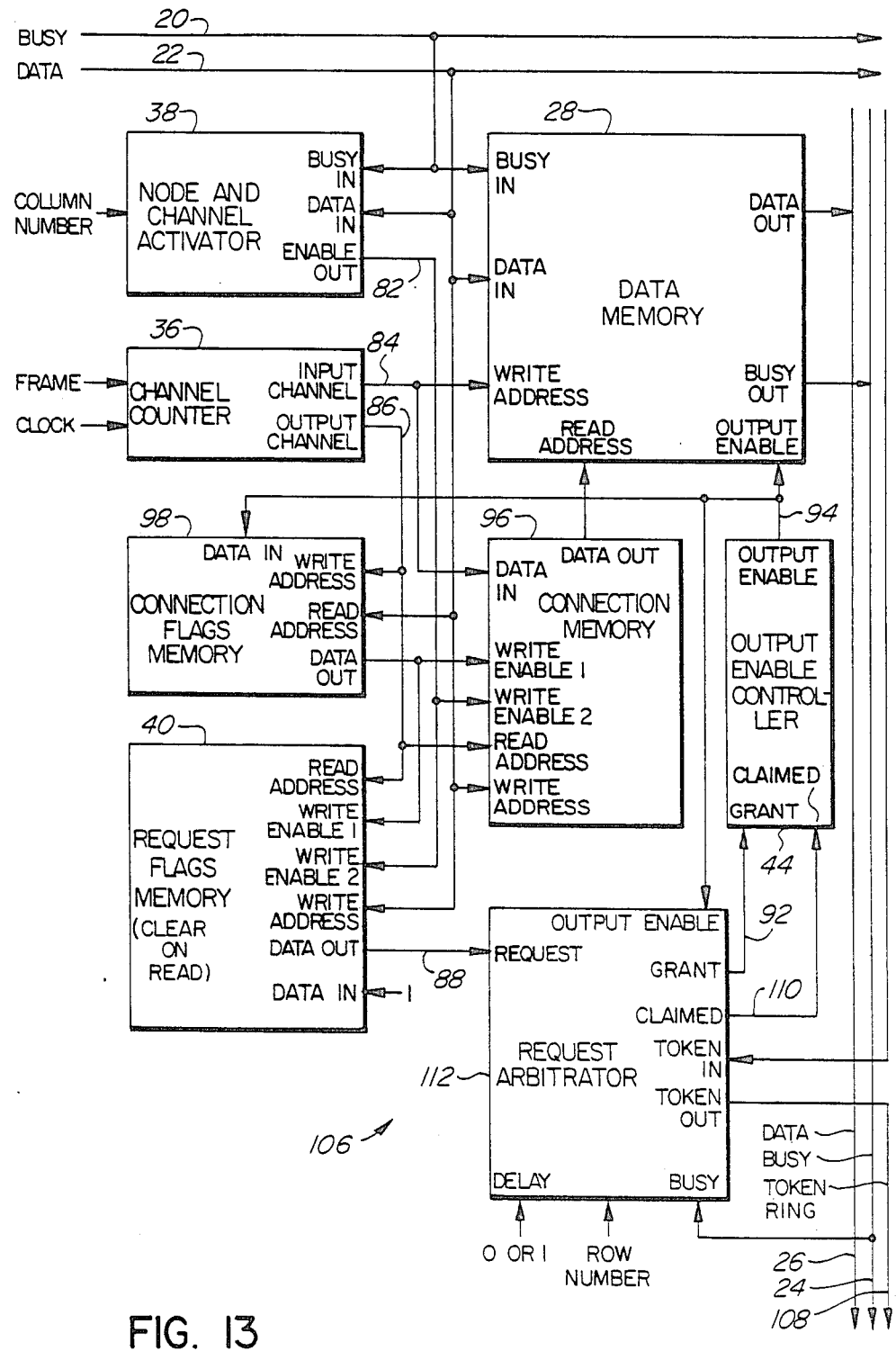
FIG. 13 is a block schematic diagram illustrating a crosspoint node of the switch matrix of FIG. 12.

In FIG. 12, crosspoint nodes 106 of a switch matrix are arranged in an array as in FIG. 9, but now the cancel line 18 and the booking line 102 are replaced by a token ring 108. FIG. 13 illustrates a crosspoint node 106, which comprises similar blocks and similar interconnections, except as described below, to those of the node 10 of FIG. 10. In particular, the node 106 includes a data memory 28, node and channel activator 38, channel counter 36, connection memory 96 which are interconnected in the same manner as in the node of FIG. 10, except that the request flags memory 40 includes another write enable input as for the connection memory 96 as described above. In addition, the node 106 includes an output enable controller 44 which is the same as that of FIG. 6 except that the signal booked in FIG. 6 is replaced by a signal claimed on a line 110, and a modified form of request arbitrator 112 which is illustrated in FIG. 14.

The token ring 108 carries a 1-bit signal for each output channel, which signal is referred to as the token for that channel. Each crosspoint node 106 in any column processes the token for one respective output channel on the output port at a time, the tokens passing successively from node to node around the ring 108. It follows that there must be at least as many output channels per output port, and hence tokens in a token ring 108, as there are input ports or rows of crosspoint nodes 106. In this embodiment of the invention, each token is a logic 1 if the respective output channel is busy, and is a logic 0 if the respective output channel is available.

Figure 14:
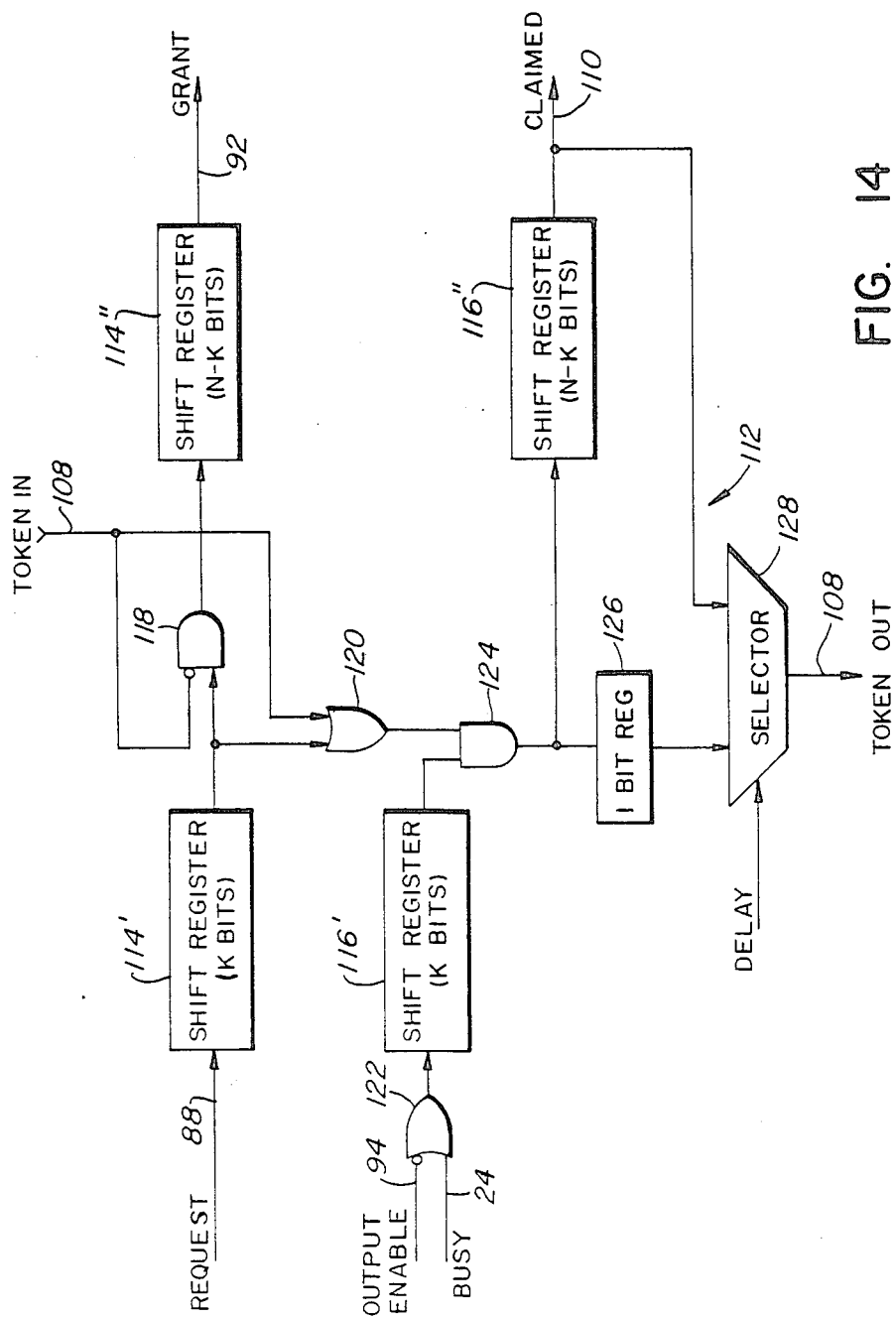
FIG. 14 is a block schematic diagram of a request arbitrator of the node of FIG. 13.

Referring to FIG. 14, the request arbitrator 112 includes two N-bit shift registers each of which is divided into a first part 114', 116' of K bits and a second part 114", 116" of N-K bits, where K is the row number of the crosspoint node 106 in the switch matrix, gates 118, 120, 122, and 124, a 1-bit register 126, and a selector 128. In a similar manner to the operation of the request arbitrator 42 of FIG. 5, an incoming signal request on the line 88 is propagated through the shift register 114', 114" to produce a signal grant on the line 92 if the output channel is available, as represented by the logical state of the incoming token on the token ring 108. If the incoming token is a logic 1 (output channel connected) or if there is a signal request, the gate 120 produces a logic 1 output which is supplied to the AND gate 124. The gate 122 produces a logic 0 output only at the end of a data call, when the busy signal becomes 0 while the output enable signal is 1, and this output is propagated through the shift register part 116' to control the gate 124 with proper timing for the respective output channel. The output of the gate 124 is thus 0 if the output channel is free and unrequested, or if a data call has just ended, and otherwise is a logic 1. This output thus constitutes the outgoing token for the relevant output channel, and is forwarded on the token ring 108 via the 1-bit register 126, provided to ensure proper timing between the rows of crosspoint nodes, and the selector 128 under the control of a signal "delay". The signal claimed on the line 110 is produced by delaying in the shift register part 116" the output of the gate 124 to provide a total delay of 1 frame through the shift register 116', 116".

The signal "delay" is normally a logic 0 for controlling the selector 128 to couple the output of the register 126 to the token ring 108. If there are more output channels per output port then there are rows of crosspoint nodes, then for the last crosspoint node in each column the signal "delay" is made a logic 1 whereby the outgoing token is supplied from the output of the shift register 116", whereby each token is delayed by exactly 1 frame of the output channels in passing around the token ring 108.

Figure 15:
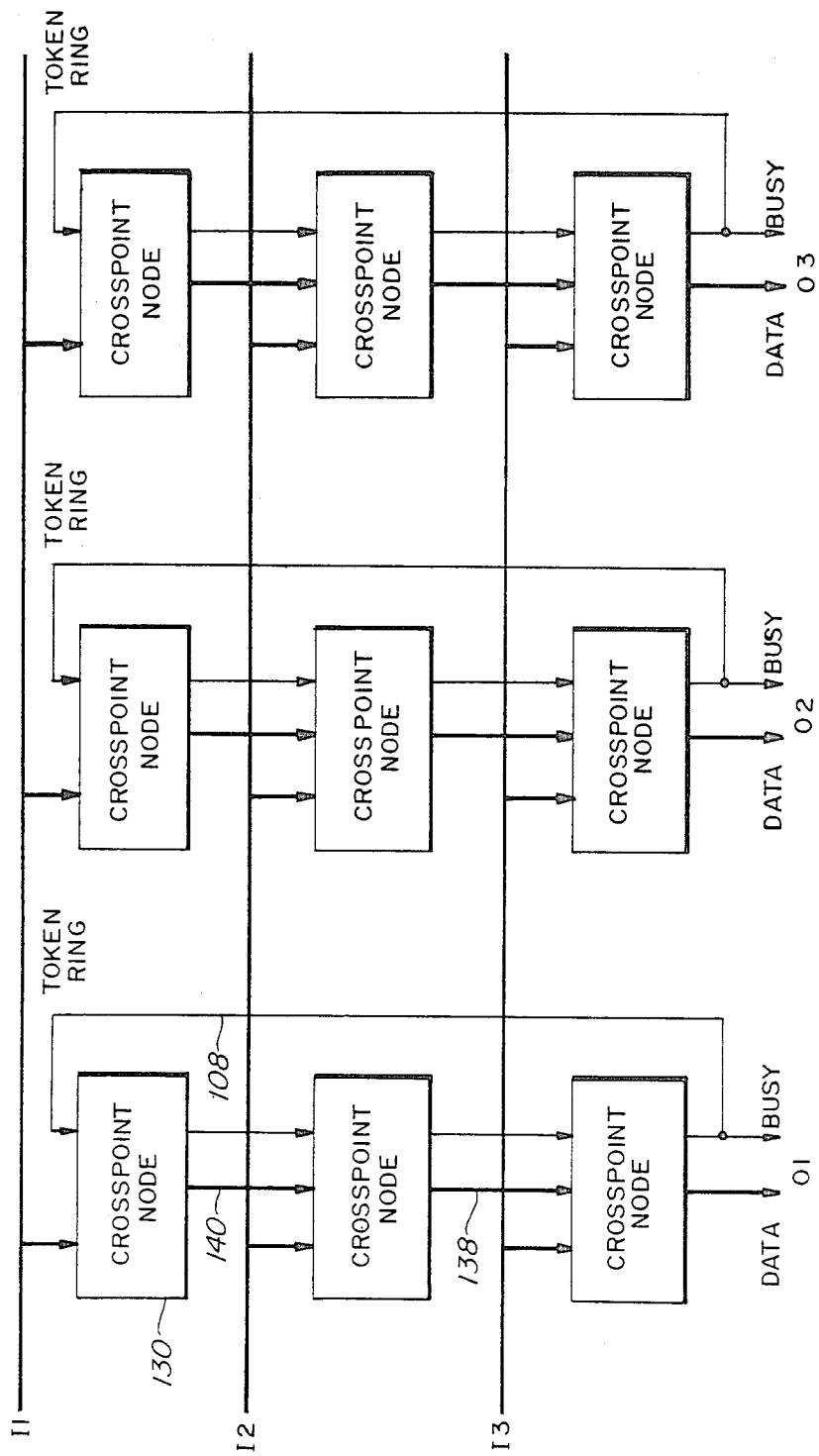
FIG. 15 schematically illustrates in the form of a block diagram a systolic switch matrix in accordance with another embodiment of the invention.
Figure 16:
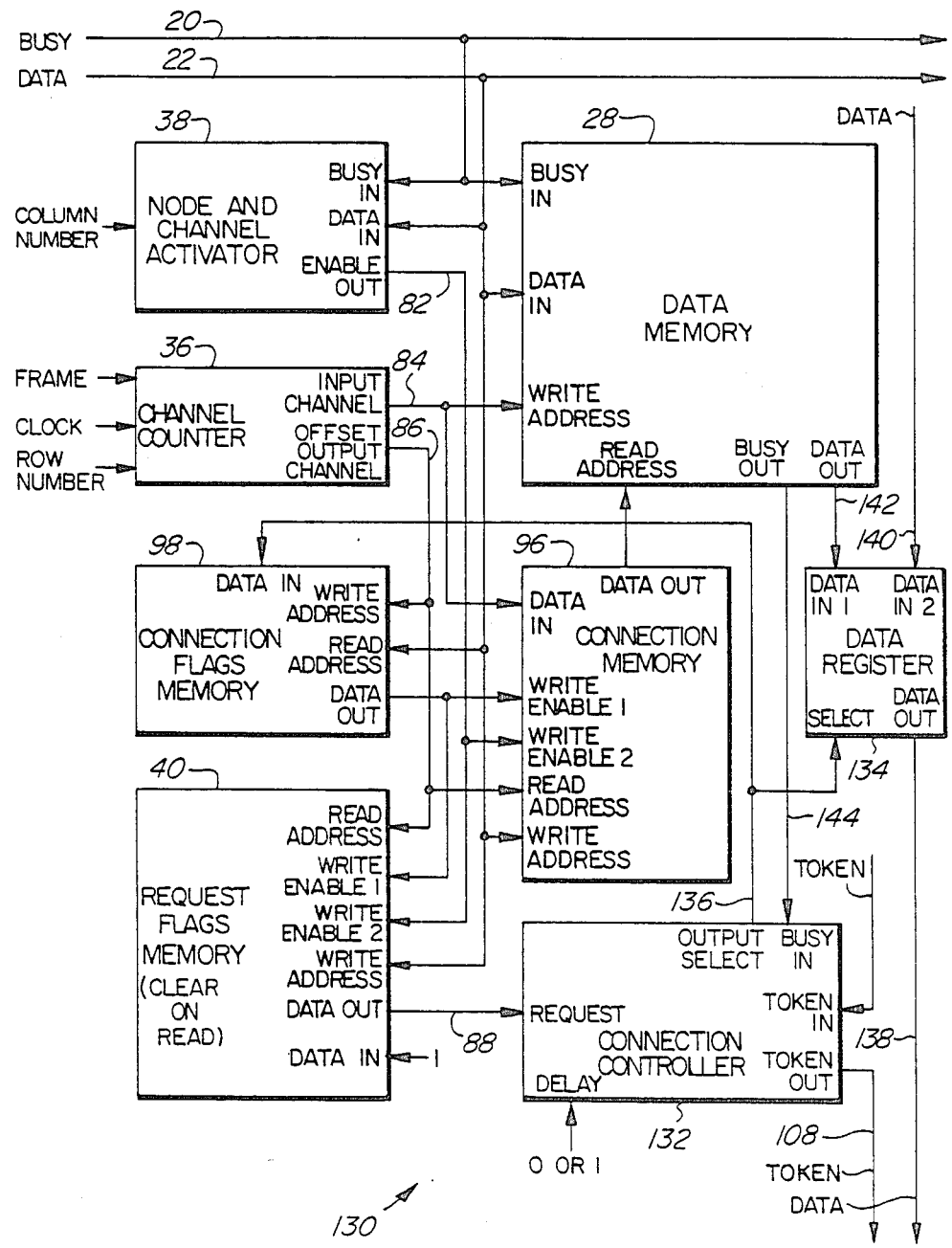
FIG. 16 is a block schematic diagram illustrating a crosspoint node of the systolic switch matrix of FIG. 15.
Figure 17:
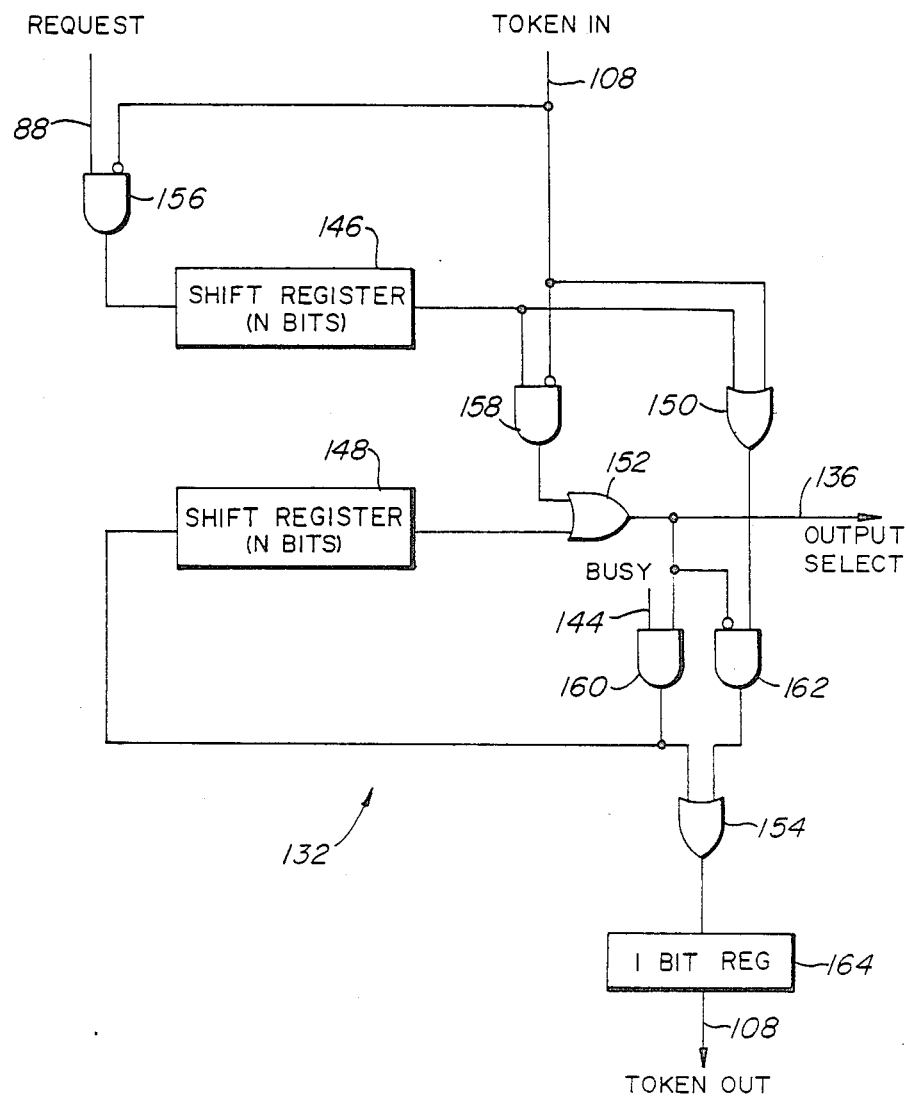
FIG. 17, which appears on the same sheet as FIG. 14, is a block schematic diagram of a connection controller of the node of FIG. 16.

The advantages of using a token ring as described above are enhanced in the embodiment of the invention illustrated in FIGS. 15 to 17. As shown in FIG. 15, in this switch matrix the crosspoint nodes 130 are arranged systolically in each column, in that data output from each node 130 in a column is supplied to the next node in the same column, rather than to a data bus which is common to all nodes in the column as in the embodiments of FIGS. 2 to 14. This considerably simplifies the practical provision of interconnections among the crosspoint nodes. The same principles can be applied to the crosspoint nodes in each row in respect of the input ports to provide an entirely systolic switch matrix in which data busses only extend between horizontally and vertically adjacent crosspoint nodes in the array, although for simplicity this is not further described here. Systolic interconnections between the crosspoint nodes can also be applied in a similar manner to the switch matrices of FIGS. 2, 9, and 12.

Furthermore, in FIG. 15 a further interconnection among crosspoint nodes is eliminated in that the token ring 108 also constitutes the busy signal coupling among the nodes.

FIG. 16 illustrates a crosspoint node 130, which generally corresponds to the form of the crosspoint node 106 of FIG. 13 except that the output enable controller 44 and request arbitrator 112 are replaced by a connection controller 132 and a data register 134 which also acts as a data selector, and the channel counter 36 is supplied with the row number of the crosspoint node which row number is used to offset the output channel count, whereby at any instant the output channel number produced by the channel counter 36 on the bus 86 differs successively for the different crosspoint nodes in each column of the switch matrix.

In the crosspoint node 130, an output select signal produced on a line 136 by the connection controller constitutes the data input for the connection flags memory 98 and controls the data register 134 via a select input thereof. When the output select signal is a logic 0 the data register 134 stores, and supplies to the next crosspoint node in the same column via a data bus 138, that data which it receives via a data bus 140 from the proceding crosspoint node in the same column. Conversely, when the output select signal on the line 136 is a logic 1, representing a connection being made via this crosspoint node, the data register 134 is controlled to store and supply on the data bus 138 data which is read out from the data memory 28 via its data output bus 142. The provision of the data register 134 thus removes the need for an output enable control signal for the data memory 28, as data is only supplied from the data memory 28 to the output data bus 138 when a connection via the crosspoint node is to be made.

The busy signal from the incoming line 20, also stored in the data memory 28, is read therefrom with the data and is supplied via a line 144 to a busy input of the connection controller 132, which is illustrated in FIG. 17. The controller 132 comprises two N-bit shift registers 146 and 148, OR gates 150, 152, and 154, AND gates 156, 158, 160, and 162, and a 1-bit register 164.

As a result of the offset output channel count produced on the bus 86 by the channel counter 36, in each column of the switch matrix the token on the token ring 108 for each output channel arrives in each crosspoint node at the time that the output channel number appears on the bus 86. If the token is a logic 1 indicating that the output channel is already busy, then in the connection controller 132 (FIG. 17) any request on the line 88 for this output channel is inhibited via the gate 156, and via the gates 158 and 152 the output select signal on the line 136 is produced with a logic 0 to control the data register 134 as described above whereby data is coupled from the bus 140 to the bus 138. The output select signal from the gate 152 also inhibits the gate 160 and enables the gate 162, whereby the incoming token is coupled via the gates 150, 162, and 154 and the 1-bit register 164 to constitute the outgoing token (logic 1) on the token ring 108.

If the incoming token is a logic 0 indicating that the respective output channel is available, then the gate 156 is enabled to conduct any request signal on the line 85 for the channel to the shift register 146. After a delay of 1 frame the shift register 146 supplies a logic 1 in response to the request signal via the gate 158, which at this time is still enabled by the incoming token of 0 for the free output channel, and the gate 152 to constitute the output select signal on the line 136, in response to which the data register 134 supplies data for this output channel from the data memory 28 to the outgoing data bus 138 as described above. This logic 1 inhibits the gate 162 and, for as long as the busy signal for the data call remains a logic 1 to enable the gate 160, maintains itself via the gate 160, shift register 148 providing a 1-frame delay, and the gate 152, and also produces the outgoing token on the token ring 108 with a logic 1, indicating that the output channel is busy, via the gate 154 and the 1-bit register 164. At the end of the data call the busy signal on the line 144 becomes 0, causing the outgoing token to become 0 to indicate that the output channel is free and, after a delay of 1 frame due to the shift register 148, causing the output select signal on the line 136 again to become 0.

The correspondence between the state of the token and the busy signal can be clearly seen from the above description, whereby as already stated the busy signal can be constituted by the token ring signal at the output of each crosspoint node 130.

Although not illustrated in FIG. 17, as explained with reference to FIG. 14 the outgoing token may be delayed in an (N-K)-bit shift register, rather than the 1-bit register 164, in the last crosspoint node of each column if there are fewer rows of crosspoint nodes than there are output channels per port, under the control of the delay signal supplied to the connection controller 132 as shown in FIG. 16.

Figure 18:
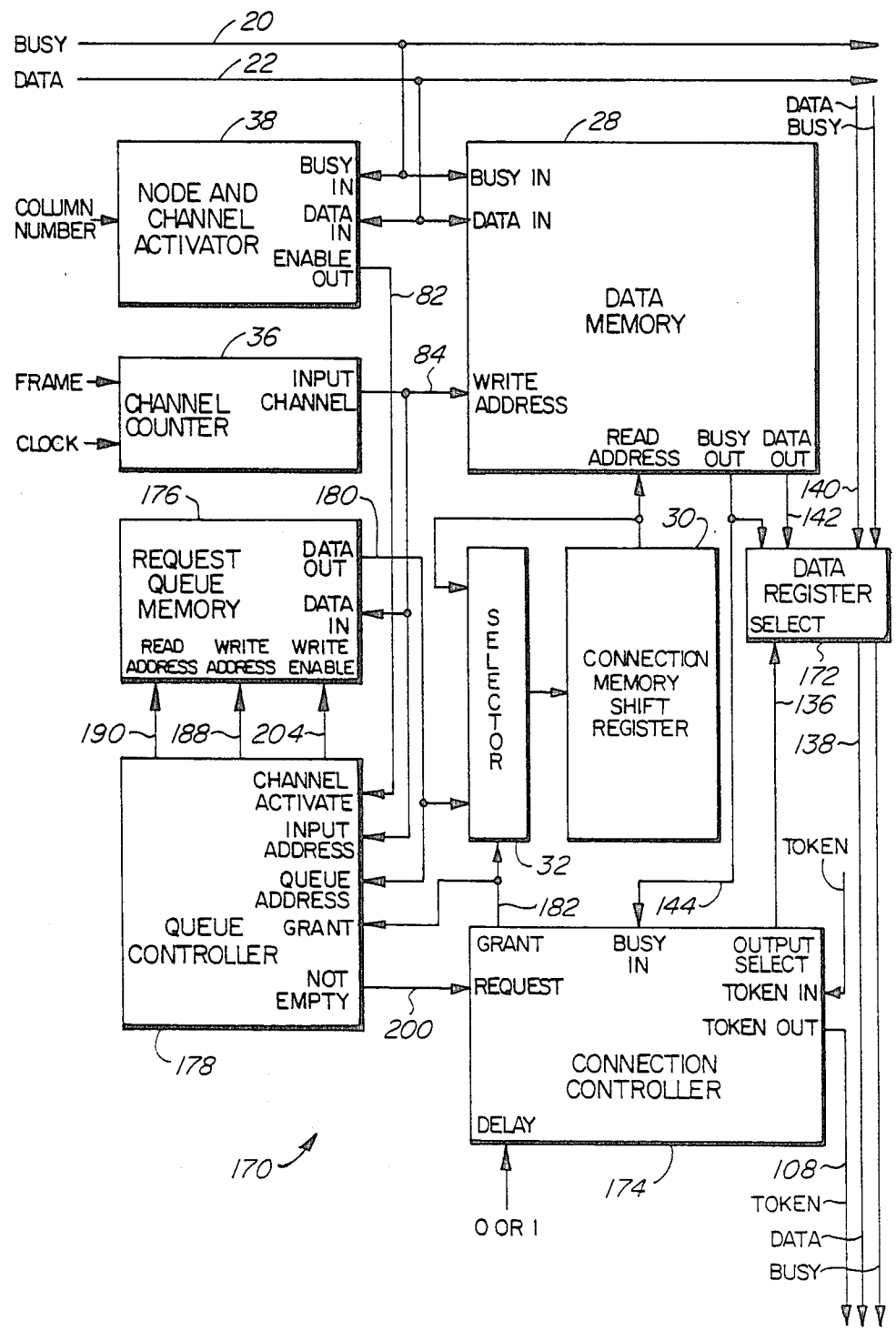
FIG. 18 is a block schematic diagram illustrating an alternative form of crosspoint node of a systolic switch matrix.

FIG. 18 illustrates a modified form of crosspoint node 170, for use in a switch matrix generally as illustrated in FIG. 15 except that the busy line is separate from the token ring 108, for making connections between incoming channels of the input ports and arbitrary free output channels on specific output ports; in other words, each connection is desired to be to a specific output port, but may be to any output channel on that output port. As a specific output channel is not required, in this case the data format is reduced to that shown in FIG. 21, in which the header is reduced to a single byte at the start of the data call representing the desired output port number.

Referring to FIG. 18, the crosspoint node 170 illustrated therein comprises the data memory 28, node and channel activator 38, and channel counter 36 as described above, except that the channel counter 36 no longer provides an output channel count, and a data register 172 which generally corresponds to the register 134 of FIG. 16 except that it also selects and stores the respective busy signal as well as the data signal. The node 170 also includes a connection memory shift register 30 and selector 32 arranged in the manner of FIG. 3, a connection controller 174, a request queue memory 176, and a queue controller 178.

The request queue memory 176 stores the input channel count or address from the bus 84, of each input channel of the respective input port requesting a connection to an output channel of the respective output port, at a write address and under the control of a write enable signal supplied by the queue controller 178. Reading of input channel addresses from the request queue memory 176, to a bus 180 and via the selector 32 to the connection memory shift register 30 under the control of a grant signal provided by the connection controller 174 on a line 182, is effected from a read address also supplied by the queue controller 178.

Figure 19:
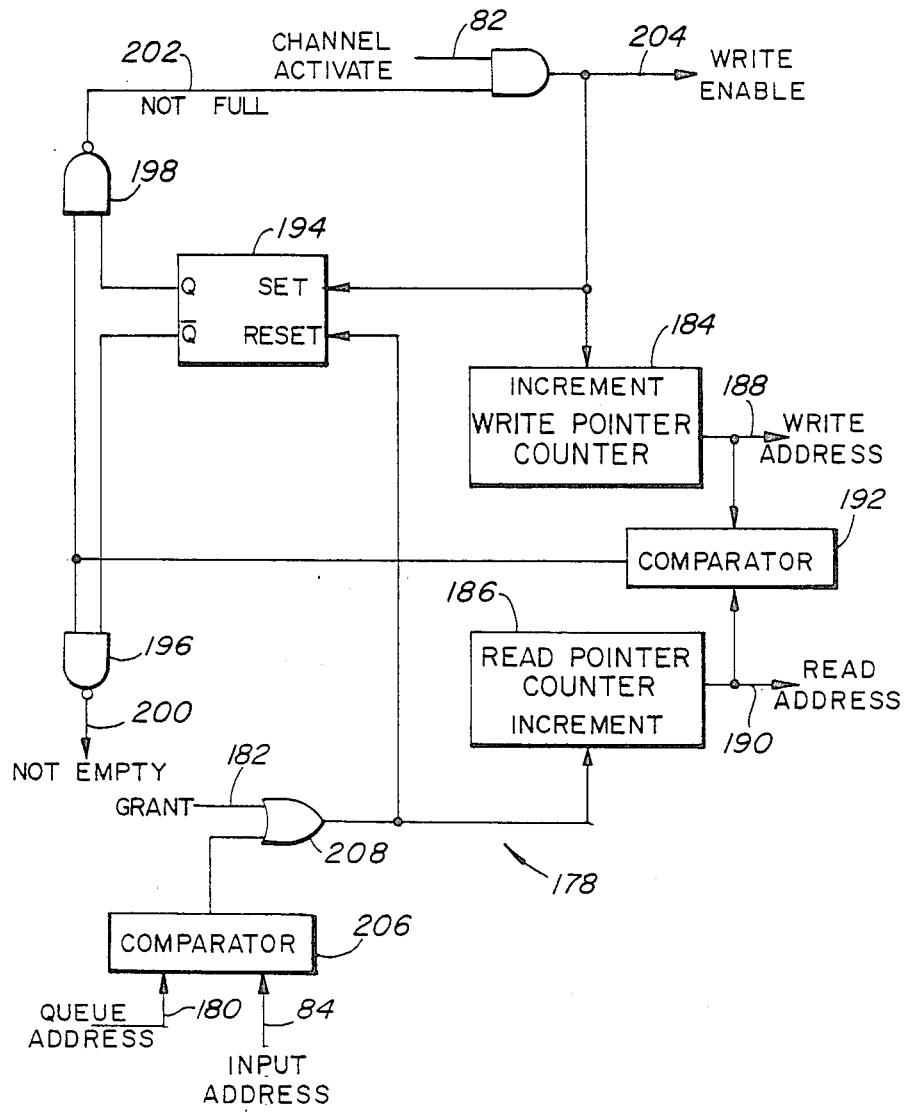
FIG. 19 is a block schematic diagram of a queue controller of the node of FIG. 18.

To this end the queue controller 178, shown in FIG. 19, comprises write and read pointer counters 184 and 186 for supplying the write and read addresses on address busses 188 and 190, respectively. The controller 178 also includes a comparator 192, set-reset flip-flop 194 and NAND gates 196 and 198 for producing not empty and not full signals on lines 200 and 202, respectively, these signals representing the state to which the request queue memory 176 is filled. The controller 178 further includes an AND gate 204, which is responsive to the not full signal on the line 202 and a channel activate signal, produced on the line 82 by the node and channel activator 38 as described above at the start of a data call on an input channel, to produce the write enable signal for the request queue memory 176 on a line 204; a comparator 206 which compares the input channel addresses on the bus 84 with the current queue address read out to the bus 180 from the request queue memory 176 and produces an output signal in the event of a match; and an OR gate 108 which is responsive to this comparator 206 output or the grant signal on the line 182 to produce an output signal which increments the read pointer counter 186 and resets the flip-flop 194. The write pointer counter 184 is incremented and the flip-flop 194 is set in response to the write enable signal on the line 204, the outputs of the flip-flop 194 controlling the gates 196 and 198 to which the output of the comparator 192 is also supplied.

Figure 20:
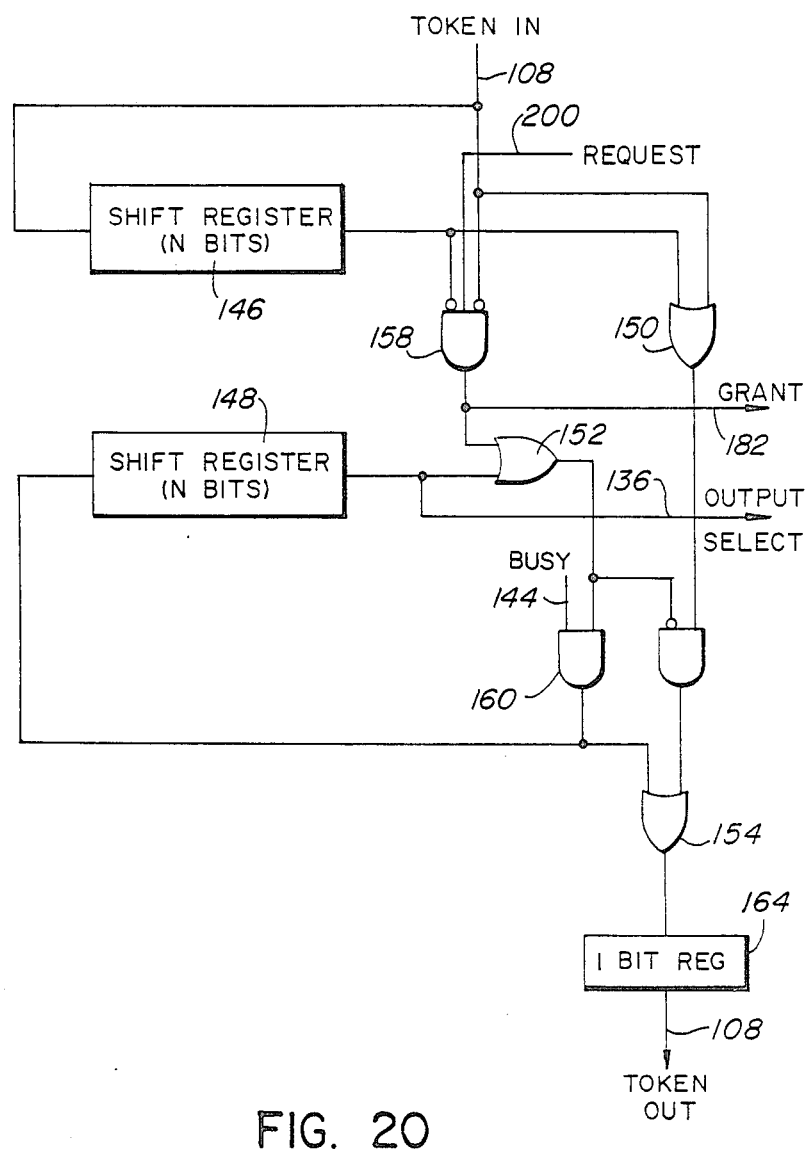
FIG. 20 is a block schematic diagram of a connection controller of the node of FIG. 18.

The connection controller 174, shown in FIG. 20, is similar to the connection controller 132 of FIG. 17 except as described below. In the controller 174, the incoming token is supplied directly to the input of the shift register 146, the gate 156 (FIG. 17) being dispensed with and the request signal, constituted by the not empty signal on the line 200, being supplied to a third input of the gate 158. The output of the shift register 146 is now supplied to an inverting input of the gate 158, the grant signal on the line 182 is taken from the output of the gate 158, and the output select signal on the line 136 is taken from the output of the shift register 148, instead of from the output of the gate 152 as in FIG. 17.

Assuming that the request queue memory is not full, then at the start of a data call on an input channel, in response to the signal on the line 82, the write enable signal is produced on the line 204, the input channel number or address is stored in the request queue memory 176, and the write pointer counter 184 is incremented. The gate 196 produces the signal not empty on the line 200, which constitutes a request signal to the connection controller 174. In response to a 0 token incoming on the token ring 108 indicating an available output channel for two successive frames, in response to the request signal the gate 158 produces the grant signal on the line 182, and sets the outgoing token to 1 and produces the output select signal on the line 136 as a logic 1 after a 1-frame delay. In response to the grant signal on the line 182 a requesting input channel number is read from the request queue memory 176 via the selector 32 into the connection memory shift register 30, and thereafter the busy signal and data of this input channel are output via the data register 172 for the duration of the data call, i.e. while the busy signal on the line 144 remains a logic 1. In response to the signal grant on the line 182 the read pointer counter 186 is incremented.

This process continues for other requesting input channels for each output channel which is free, until the request queue memory 176 is empty and the not empty signal on the line 200 becomes 0, terminating requests to the connection controller 174. In the event that a request can not be satisfied, for example if all of the output channels are busy, then after 1 frame the comparator 206 detects a match between the input address on the bus 84 and the current requesting input channel stored in the request queue memory 176 and read out as a queue address on the bus 180, in response to which the read pointer counter 186 is incremented without the request being satisfied so that the relevant data call is not connected.

From the foregoing description it should be appreciated that the invention enables the provision of numerous advantages in the switching of signals through a switch matrix or switching network. In particular, the switch matrix provides non-blocking connections from any input channel to any specified output channel and port provided the output channel is not already busy, or in the case of the embodiment of FIGS. 18 to 20 to any free output channel on a specified output port. The connections are established at the same rate that the routing information is provided, including the necessary resolution of contention among different input channels for the same output channel, whereby no data is lost and even very short messages are switched efficiently. As a result, the connection routing information is included as a header for each data call, whereby control messages are handled in the same manner as data traffic and there is no need for a connection control bus. This, and the manner of contention resolution using as few interconnections as possible among the crosspoint nodes, reduces the complexity of crosspoint node interconnections and the pin-out of VLSI (very large scale integrated) devices which are conveniently used to constitute each crosspoint node. In the latter respect it is also observed that information flow among crosspoint nodes is at the same rate as the data flow, and that the systolic switch matrix embodiments ease timing restrictions and enable a reduced output drive capability from each crosspoint node, thereby facilitating VLSI implementation of the crosspoint nodes.

Figure 21:
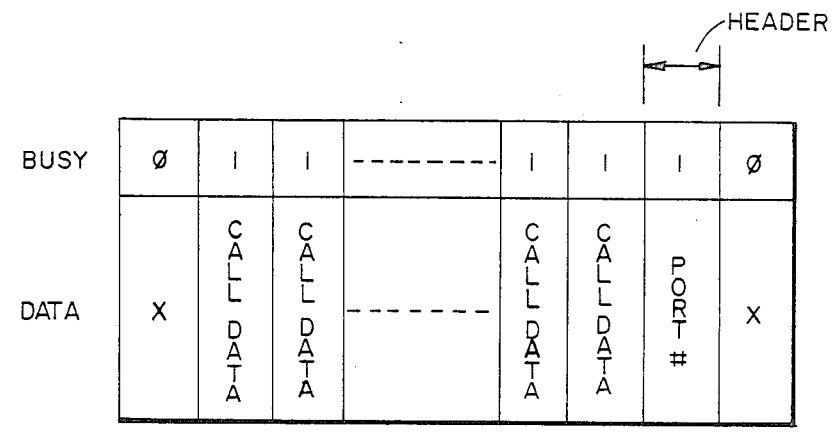
FIG. 21 which appears on the same sheet as FIG. 1, schematically illustrates a data format for switching by a switch matrix including the crosspoint node of FIG. 18.

It should be appreciated that, with an appropriate indication in the data traffic flow to distinguish between the different types of data call header, and hence connection, represented in FIGS. 1 and 21, for example with the inclusion of an additional data call type byte in the header, each crosspoint node can be designed simultaneously to handle both of the types of connection described with reference to FIGS. 15 to 17 and FIGS. 18 to 21, each crosspoint node then including a common data memory 28, connection memory 96, counter 36, activator 38, data register 134, and connection controller 132 for contention resolution.

Numerous other modifications, variations, and adaptations may be made to the particular embodiments of the invention described above without departing from the scope of the invention as defined in the claims.

What is claimed is:

1. A method of switching, in a switch comprising a plurality of crosspoint nodes arranged in a matrix of n rows and m columns, where n and m are positive integers, tdm (time division multiplexed) information comprising a header including routing information for the switch, data to be switched following the routing information for the switch, and additional information providing an indication of the start of the header and an indication of the end of the data, the method comprising the steps of, in each crosspoint node:

determining, in response to the indication of the start of header and in dependence upon the routing information, whether a connection is to be made through the node and if so establishing a connection through the node; and terminating the connection through the node in response to the indication of the end of the data.

2. A method as claimed in claim 1 wherein the connection through the node is established for only the data and additional information following the routing information for the switch.

3. A method as claimed in claim 1 wherein the connection through the node is established in dependence upon the routing information prior to the occurrence of the data to be switched following the header.

4. A method of switching, in a switch comprising a plurality of crosspoint nodes arranged in a matrix of n rows and m columns, where n and m are positive integers, information of channels multiplexed in tdm (time division multiplexed) frames, the information of each channel comprising a header including routing information for the switch, data to be switched following the routing inforamtion for the switch, and additional information providing an indication of the start of the header and an indication of the end of the data, the method comprising the steps of, for each channel and in each crosspoint node:
in response to the indication of the start of the header and in dependence upon the routing information, determining wheter a connection is to be made through the node and if so establishing a connection for at least the data and additional information following the routing information for the switch, said connection being established within one frame of the end of the routing information; and
terminating the connection in response to the indication of the end of the data.

5. A method as claimed in claim 4 wherein m is a plural integer, the switch comprising in each row a plurality of m crosspoint nodes each associated with a respective output port of the switch for establishing a connection of a channel thereto, wherein said routing information comprises an output port number in respect of the output port to which a connection is to be established, and the step of determining in each crosspoint node whether or not a connection is to be made through the node is dependent upon the output port number in said routing information.

6. A method as claimed in claim 5 wherein said routing information further comprises a channel number identifying one of a plurality of tdm channels of an output port to which a connection is to be established, the method further comprising the step of establishing, in the crosspoint node in which it is determined that a connection is to be made, a connection to a channel of the output port in dependence upon the channel number in said routing information.

7. A method as claimed in claim 6 wherein the channel number follows the output port number in said routing information in successive tdm frames.

8. A method as claimed in claim 7 and comprising the steps of providing the header and data to be switched on a parallel data bus, and providing at least one additional line in parallel with said parallel data bus for said additional information.

9. A method as claimed in claim 4 and comprising the steps of providing the header and data to be switched on a parallel data bus, and providing at least one additional line in parallel with said parallel data bus for said additional information.

10. A switch for establishing connections between incoming tdm (time division multiplexed) channels on n input ports and outgoing tdm channels on m output ports, where n and m are positive integers, information on each incoming channel to be connected comprising a header including routing information for the switch, data to be switched following the routing information for the switch, and additional information providing an indication of the start of the header and an indication of the end of the data, the switch comprising a plurality of crosspoint nodes in a matrix of m columns and n rows, each crosspoint node coupled between a respective input port and a respective output port for establishing channel connecitons therebetween, each crosspoint node including means for establishing a connection, between an incoming channel of the respective input port and an outgoing channel of the respective output port, in response to the indication of the start of the header on the incoming channel and in dependence upon the routing information, and means for terminating the connection in response to the indication of the end of the data.

11. A switch as claimed in claim 10 wherein there is a plurality of crosspoint nodes in each row, the crosspoint nodes of each column being coupled to a respective one of a plurality of output ports, and said routing information comprises an output port number in respect of the output port to which a connection is to be established, each crosspoint node comprising activating means responsive to an indication of the start of a header for an incoming channel on the respective input port for activating the crosspoint node to establish a connection to an outgoing channel of the respective output port in dependence upon the output port number in said routeing information.

12. A switch as claimed in claim 11 wherein in each crosspoint node the means for establishing a connection comprises a data memory for storing, for each incoming channel on the respective input port, at least the data to be switched and the additional information following the routing information for the switch, and a connection memory for storing in respect of each connection established via the crosspoint node an address for addressing the data memory for said connection, the crosspoint node including means for storing in the connection memory an address for establishing a connection in response to the activating means activating the crosspoint node to establish a connection to an outgoing channel which is free.

13. A switch as claimed in claim 12 and including, for each output port, means for storing an indication of whether or not each outgoing channel on the output port is free, each crosspoint node coupled to the respective output port including means for inhibiting the means for storing an address in the connection memory in respect of each outgoing channel which is not free.

14. A switch as claimed in claim 13 wherein in each crosspoint node the means for terminating a connection established via the crosspoint node in response to the indication of the end of the data comprises output control means for enabling the supply of the data and additional information stored in the data memory to the respective outgoing channel for each connection established via the crosspoint node, the output control means being responsive to the additional information thereby supplied to the respective outgoing channel providing an indication of the end of the data to disable said supply of the data and additional information to the respective outgoing channel.

15. A switch as claimed in claim 12 wherein in each crosspoint node the means for terminating a connection established via the crosspoint node in response to the indication of the end of the data comprises output control means for enabling the supply of the data and additional information stored in the data memory to the respective outgoing channel for each connection established via the crosspoint node, the output control means being responsive to the additional information thereby supplied to the respective outgoing channel providing an indication of the end of the data to disable said supply of the data and additional information to the respective outgoing channel.

16. A switch as claimed in claim 10 wherein there is a plurality of crosspoint nodes in each column, each crosspoint node of a column including means for resolving contention among a plurality of input channels for establishing a connection to the same outgoing channel of the respective output port.

17. A switch as claimed in claim 16 wherein the means for resolving contention comprises storage means for storing, for each output port, an indication of whether or not each outgoing channel on the output port is free; each crosspoint node having a predetermined priority for resolving contention and including:
  activating means responsive to an indication of the start of a header for an incoming channel on the respective input port for producing a request signal for establishing a connection to an outgoing channel if the outgoing channel is indicated by the indication in said storage means to be free, and for modifying said indication in response to the request signal to indicate that the outgoing channel is not free;
  means for producing a request cancelling signal, in response to the request signal, for a crosspoint node in the same column having a lower priority;
  means for cancelling the request signal in response to a request cancelling signal from a crosspoint node in the same column having a higher priority; and
  means for establishing a connection of the incoming channel to the outgoing channel in response to a request signal which is not cancelled.

18. A switch as claimed in claim 17 wherein in each crosspoint node the means for establishing a connection comprises a data memory for storing, for each incoming channel on the respective input port, the data to be switched and the additional information following the routing information for the switch, and a connection memory for storing in respect of each connection established via the crosspoint node an address for addressing the data memory for said connection, each crosspoint node including output control means for enabling the supply of the data and additional information stored in the data memory to the respective outgoing channel for each connection established via the crosspoint node, the output control means of all of the crosspoint nodes in the same column being interconnected thereby to constitute said storage means, each crosspoint node further including means for storing in the connection memory an address for establishing a connection in response to an indication of the start of a header for an incoming channel for establishing a connection to an outgoing channel which is indicated by said storage means to be free.

19. A switch as claimed in claim 18 wherein in each crosspoint node the output control means is responsive to the additional information, supplied to the respective outgoing channel in respect of each connection established via the crosspoint node, providing an indication of the end of the data to disable the supply of the data and additional information to the respective outgoing channel and to indicate that the respective outgoing channel is free, whereby the output control means constitutes said means for terminating the connection.

20. A switch as claimed in claim 16 wherein the means for resolving contention comprises token ring means for each column of crosspoint nodes, each token ring means being arranged to supply cyclically to each crosspoint node in the column in turn a token in respect of each outgoing channel of the respective output port, each token providing an indication of whether or not the respective outgoing channel is free.

21. A switch as claimed in claim 20 wherein each crosspoint node in a column includes means for selectively supplying as output data from the crosspoint node either data from an incoming channel of the respective input port for a connection established via the crosspoint node or data output from a preceding crosspoint node in the same column.

22. A switch as claimed in claim 21 wherein the token for each outgoing channel of each output port constitutes said additional information.

23. A switch for establishing connections between incoming tdm (time division multiplexed) channels on n input ports and outgoing tdm channels on m output ports, where n and m are plural integers, information on each incoming channel to be connected comprising a header including routing information for the switch, data to be switched following the routing information for the switch, and additional information providing an indication of the start of the header and an indication of the end of the data, the routing information comprising an output port number in respect of the output port to which a connection is to be established, the switch comprising a matrix of m columns and n rows of crosspoint nodes, each crosspoint node coupled between a respective input port and a respective output port for establishing channel connections therebetween, each crosspoint node comprising activating means responsive to an indication of the start of a header for an incoming channel on the respective input port for activating the crosspoint node to establish a connection to an outgoing channel of the respective output port in dependence upon the output port number in the routing information, and means for terminating the connection in response to the indication of the end of the data for the channel, and each crosspoint node of each column including means for resolving contention among a plurality of input channels for establishing a connection to the same outgoing channel of the respective output port.

* * * * *